(12) United States Patent
Suematsu et al.

(10) Patent No.: US 7,648,787 B2
(45) Date of Patent: Jan. 19, 2010

(54) GAS LEAK DETECTION DEVICE AND FUEL CELL SYSTEM

(75) Inventors: Keigo Suematsu, Susono (JP); Tatsuaki Yokoyama, Susono (JP); Kenji Umayahara, Nishikamo-gun (JP); Nobuhiro Tomosada, Kodaira (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 609 days.

(21) Appl. No.: 11/597,806

(22) PCT Filed: Nov. 28, 2005

(86) PCT No.: PCT/IB2005/003562
§ 371 (c)(1),
(2), (4) Date: Nov. 28, 2006

(87) PCT Pub. No.: WO2006/056878
PCT Pub. Date: Jun. 1, 2006

(65) Prior Publication Data
US 2007/0224473 A1    Sep. 27, 2007

(30) Foreign Application Priority Data
Nov. 29, 2004  (JP)  .............................. 2004-343259
Nov. 11, 2005  (JP)  .............................. 2005-327305

(51) Int. Cl.
H01M 8/04   (2006.01)
H01M 8/00   (2006.01)
G01M 3/00   (2006.01)
G01M 3/04   (2006.01)

(52) U.S. Cl. ........................ 429/25; 429/13; 73/40.5 R; 73/49.5

(58) Field of Classification Search ........................ None
See application file for complete search history.

(56) References Cited

U.S. PATENT DOCUMENTS

| 6,851,298 B2 * | 2/2005 | Miura et al. .............. 73/40.5 R |
| 2002/0094467 A1 | 7/2002 | Nonobe et al. |
| 2003/0077495 A1 | 4/2003 | Scartozzi et al. |

FOREIGN PATENT DOCUMENTS

JP    A 63-51061    3/1988

(Continued)

*Primary Examiner*—Melvin C Mayes
*Assistant Examiner*—Sarah Van Oudenaren
(74) *Attorney, Agent, or Firm*—Oliff & Berridge, PLC

(57) ABSTRACT

In a fuel cell system (100), the amount of fuel gas supplied through an fuel gas supply passage (24) and the amount of fuel gas consumed by a fuel cell (10) are detected. A difference between the amount of supplied fuel gas and the amount of consumed fuel gas is calculated by subtracting the amount of consumed fuel gas from the amount of supplied fuel gas. The pressure of the fuel gas in a leak detection passage (Cx), the change in the pressure of the detected fuel gas can be detected, and the change in the amount of fuel gas in the gas leak detection passage (Cx) due to the change in the pressure of the fuel gas can thus be detected. The difference is corrected by subtracting the change in the amount of fuel gas in the gas leak detection passage from the difference. When the corrected difference is equal to or greater than a predetermined value, a fuel gas leak is detected in the leak detection passage (Cx).

13 Claims, 11 Drawing Sheets

FOREIGN PATENT DOCUMENTS

| | | |
|---|---|---|
| JP | A 7-71994 | 3/1995 |
| JP | A 10-284098 | 10/1998 |
| JP | A 11-108730 | 4/1999 |
| JP | B2 3137511 | 2/2001 |
| JP | A 2002-352824 | 12/2002 |
| JP | A 2004-281132 | 10/2004 |

* cited by examiner

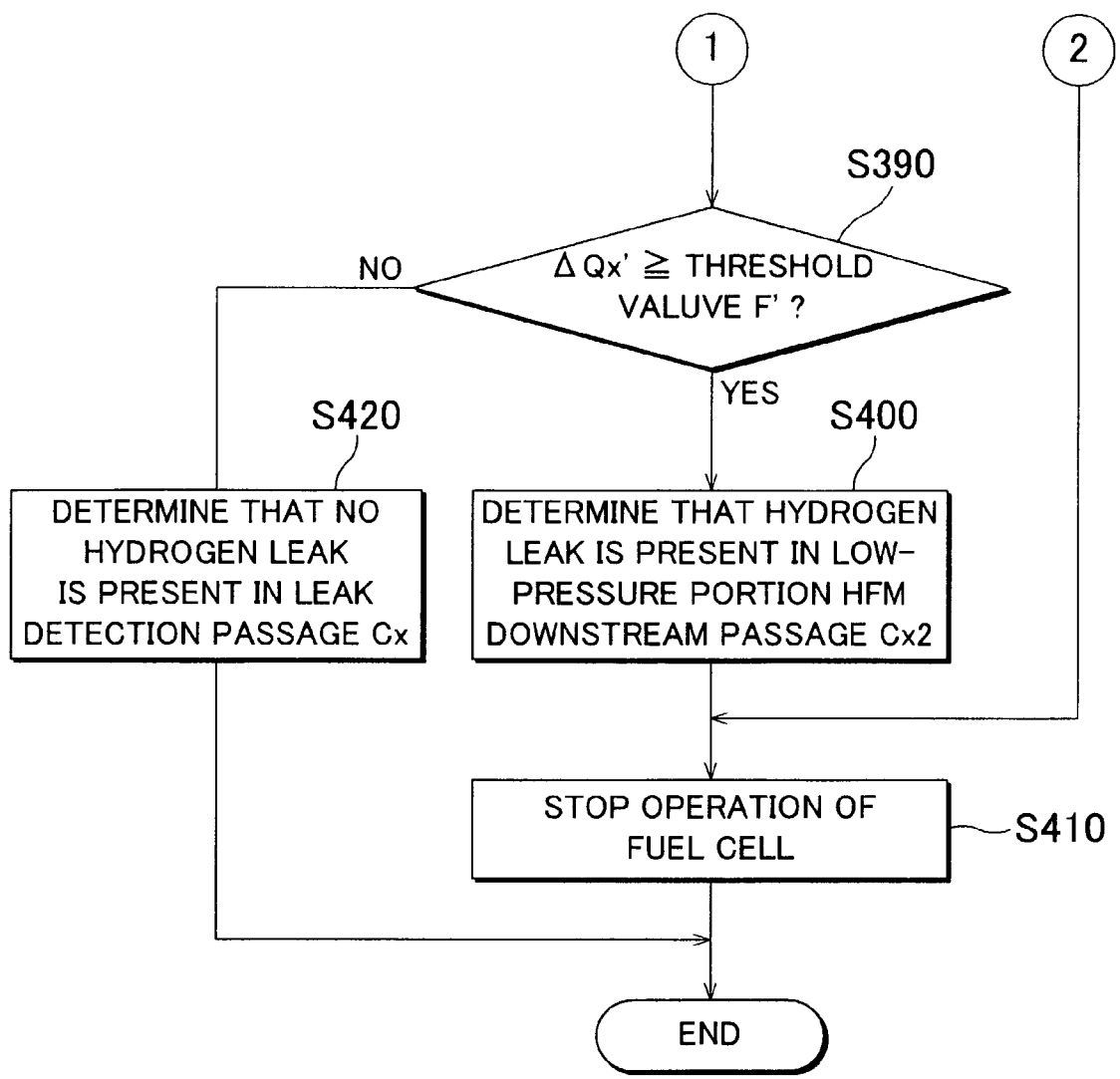

GAS LEAK DETECTION DEVICE AND FUEL CELL SYSTEM

BACKGROUND OF THE INVENTION

1. Field of the Invention

The invention relates to methods and devices for the detection of fuel gas leaks in a fuel cell system.

2. Description of the Related Art

Recently, attention has been given to fuel cells as a new energy source. The fuel cells generate electric power using oxygen and an appropriate fuel gas, such as hydrogen. A typical fuel cell system includes a fuel gas supply passage, a fuel gas discharge passage, and a gas circulation passage. Fuel gas is supplied to the fuel cell through the fuel gas supply passage. Fuel gas is discharged (purged) from a fuel electrode (hereinafter, referred to as "anode") through the fuel gas discharge passage. The discharged fuel gas flows back to the fuel gas supply passage through the gas circulation passage. Hereinafter, the fuel gas supply passage, the fuel gas discharge passage, the gas circulation passage, and any other passages that the fuel gas may pass through, will be collectively referred to as "anode system passages".

Technologies that can detect fuel gas leaks in the anode system passages are known. An example of such technology is disclosed in Japanese Patent Application Publication No. JP 2004-281132 A (hereinafter, referred to as "JP 2004-281132 A). In particular, JP 2004-281132 A describes the detection of a gas leak by comparing the amount of fuel gas flowing in the anode system passages detected by a hydrogen flow meter (HFM) or the like with the amount of fuel gas consumed by the fuel cell to generate electric power, the amount of fuel gas flowing from the anode system passages to an oxygen electrode through an electrolyte membrane of the fuel cell, and the amount of gas discharged (purged) through the fuel gas discharge passage.

That is, according to the disclosure of JP 2004-281132 A, a gas leak is detected by comparing the detected amount of fuel gas flowing in the anode system passages with the amount of fuel gas that 1) is consumed by the fuel cell to generate electric power, 2) flows from the anode system passages through an electrolyte membrane of the fuel cell to an oxygen electrode and 3) is discharged (purged) through the fuel gas discharge passage, as these are factors that cause the detected amount of fuel gas flowing in the anode system passages to fluctuate. However, the technology disclosed in JP 2004-281132 A does not take into account other factors that may cause the detected amount of fuel gas flowing in the anode system passages to fluctuate, which reduces gas leak detection accuracy.

DISCLOSURE OF THE INVENTION

It is an object of the invention to provide a technology which can improve accuracy in detecting leaks of fuel gas in a fuel cell system.

A first aspect of the invention relates to a gas leak detection device for detecting leaks of fuel gas in a fuel cell system. The fuel cell system includes a fuel cell, a fuel gas supply source, a supply passage, a discharge passage, and a purge valve. Fuel gas is supplied from the fuel gas supply source to the fuel cell through the supply passage. Fuel gas is discharged from the fuel cell through the discharge passage. The purge valve, which adjusts the amount of fuel gas discharged from the fuel cell, is provided in the discharge passage. The gas leak detection device includes a supply-amount detector in the supply passage, which detects the amount of supplied fuel gas. The supply passage includes a first passage positioned downstream of the supply-amount detector. The fuel cell includes a second passage through which the fuel gas flows. The discharge passage includes a third passage positioned upstream of the purge valve. The gas leak detection device further includes a consumption-amount calculator, a pressure detector, a change-amount calculator, a difference-amount calculator, and a fuel-gas leak detector. The consumption-amount calculator calculates the amount of fuel gas consumed by the fuel cell. The pressure detector detects the pressure of the fuel gas in a gas leak detection passage including the first passage, the second passage, and the third passage. The change-amount calculator obtains the change in the fuel gas pressure using the detected pressure, and calculates the change in the amount of fuel gas in the gas leak detection passage due to the change in the pressure of the fuel gas. The difference-amount calculator calculates a difference between the detected amount of supplied fuel gas and the sum of the amount of consumed fuel gas and the change in the amount of fuel gas in the gas leak detection passage by subtracting the amount of consumed fuel gas and the change in the amount of fuel gas in the gas leak detection passage from the amount of supplied fuel gas. The fuel-gas leak detector determines that a fuel gas leak is present in the gas leak detection passage when the difference is equal to or greater than a first predetermined value.

The gas leak detection device having the aforementioned configuration can accurately determine whether a fuel gas leak is present even when the pressure of the fuel gas changes in the gas leak detection passage due to the change in the operating state of the fuel cell.

The gas leak detection passage may also include a circulation passage. One end of the circulation passage is connected to the supply passage at a position downstream of the supply-amount detector, and the other end of the circulation passage is connected to the discharge passage. The fuel gas flows back from the discharge passage to the supply passage through the circulation passage so that the fuel gas can be reused.

With this configuration, the gas leak detection device can detect any fuel gas leaks present in the circulation passage.

The fuel cell system may include a circulation pump provided in the circulation passage, which delivers the fuel gas from the discharge passage to the supply passage. The gas leak detection device may include a correction portion that corrects the amount of supplied fuel gas detected by the supply-amount detector to reduce the influence of pulsation generated by the circulation pump. The difference-amount calculator calculates the difference by subtracting the amount of consumed fuel gas and the change in the amount of fuel gas in the gas leak detection passage from the corrected amount of supplied fuel gas.

This configuration reduces the change in the amount of supplied fuel gas detected by the supply-amount detector due to the pulsation of the circulation pump. Thus, the supply-amount detector can accurately detect the amount of supplied fuel gas.

The gas leak detection device may include a permeation fuel-gas amount detector that detects the amount of fuel gas flowing from the fuel electrode to the oxygen electrode of the fuel cell through an electrolyte membrane of the fuel cell. The difference-amount calculator may calculate the difference between the detected amount of supplied fuel gas and the sum of the amount of consumed fuel gas, the change in the amount of fuel gas in the gas leak detection passage, and the amount of fuel gas flowing from the fuel electrode to the oxygen electrode through the electrolyte membrane, by subtracting the amount of consumed fuel gas, the change in the amount of fuel gas in the gas leak detection passage, and the amount of fuel gas flowing from the fuel electrode to the oxygen electrode through the electrolyte membrane from the amount of supplied fuel gas detected by the supply-amount detector.

With this configuration, the gas leak detection device can accurately detect any fuel gas leaks that may occur where the fuel gas flows from the fuel electrode to the oxygen electrode of the fuel gas through the electrolyte membrane.

The gas leak detection device may include a purge amount detection portion which detects the amount of fuel gas discharged from the purge valve when the purge valve is opened. The difference amount calculator calculates the difference between the amount of supplied fuel gas detected by the supply-amount detector and the sum of the amount of fuel consumed, the change in the amount of fuel gas in the gas leak detection passage, and the amount of fuel gas discharged from the purged value, by subtracting the amount of fuel consumed, the change in the amount of fuel gas in the gas leak detection passage, and the amount of fuel gas discharged from the purged value from the detected amount of fuel supplied.

With this configuration, the gas leak detection device can accurately detect a fuel gas leak when the fuel gas is discharged from the purge valve.

The gas leak detection device may be configured as follows. The gas leak detection passage includes a plurality of sections. The pressure detector detects the pressure of the fuel gas in each of the plurality of sections in the gas leak detection passage. The change-amount calculator obtains a change in the detected pressure of the fuel gas in each of the sections; the change-amount calculator obtains the change in the amount of fuel gas in each of the sections due to the change in the pressure of the fuel gas in the corresponding section; and the change-amount calculator calculates the change in the amount of fuel gas in the gas leak detection passage, by summing the changes in the amounts of fuel gas in all the sections.

With this configuration, the change-amount calculator calculates the change in the amount of fuel gas in each of the sections due to the change in the pressure in the corresponding section. The fuel gas in each section has a different pressure. The change-amount calculator calculates the change in the amount of fuel gas in the gas leak detection passage, by summing the changes in the amounts of fuel gas in all the sections. Thus, the gas leak detection device can accurately detect a fuel gas leak.

The fuel cell system may include a pressure-release valve provided in the supply passage, which reduces the pressure of the fuel gas. The gas leak detection device may include an amount detector that detects the amount of fuel gas, and a leak determination permission portion. The amount detector is provided in the supply passage such that the pressure-release valve is positioned between the amount detector and the supply-amount detector. The leak determination permission portion permits the fuel-gas leak detector to determine whether a fuel gas leak is present, in the case where the difference between the amount of supplied fuel gas detected by the supply-amount detector and the amount of fuel gas detected by the amount detector is in a predetermined range. If the difference between the amount of supplied fuel gas detected by the supply-amount detector and the amount of fuel gas detected by the amount detector is within the predetermined range, both the amounts may be equal.

With this configuration, the change in the pressure of the fuel gas in the gas leak detection passage does not need to be taken into account, which improves the gas leak detection accuracy.

The fuel-gas leak detector may determine that a fuel gas leak is present between the supply-amount detector and the amount detector in the supply passage, when both the amount of supplied fuel gas detected by the supply-amount detector and the amount of fuel gas detected by the amount detector are constant, but the difference between the amounts is not within the predetermined range.

With this configuration, when a fuel gas leak is present between the supply-amount detector and the amount detector in the supply passage, the leak detection device can easily detect the gas leak.

The fuel cell system may include a cut-off valve provided in the supply passage at a position upstream of the supply-amount detector, which cuts off supply of the fuel gas when closed. The fuel-gas leak detector of the gas leak detection device may determine that a fuel gas leak is present in the supply passage at a position upstream of the supply-amount detector and downstream of the cut-off valve, in the case where the supply-amount detector detects a greater amount of fuel gas flowing in the direction opposite to the direction where fuel gas is supplied than a predetermined amount when the supply of the fuel gas is cut off by closing the cut-off valve.

With this configuration, when a fuel gas leak is present in the gas leak detection passage at the position upstream of the supply-amount detector and downstream of the cut-off valve, the leak detection device can easily detect a fuel gas leak. Also, on the basis of the amount of fuel gas detected by the supply-amount detector, the amount of leaking fuel gas can be easily obtained.

The fuel cell system may include a cut-off valve provided in the supply passage at a position upstream of the supply-amount detector, which cuts off supply of the fuel gas when closed. The fuel-gas leak detector may determine that a fuel gas leak is present in the gas leak detection passage, in the case where the supply-amount detector detects a greater amount of fuel gas flowing in a direction where the fuel is supplied than a predetermined amount when the cut-off valve is closed and the fuel cell is not generating electric power.

With this configuration, the leak detection device can easily detect a fuel gas leak in the gas leak detection passage. Also, on the basis of the amount of fuel gas detected by the supply-amount detector, the amount of leaking fuel gas can be easily obtained.

In the gas leak detection device, the fuel-gas leak detector may stop executing the process of determining whether a fuel gas leak is present, in the case where an output of the fuel cell is required to increase when the fuel-gas leak detector is executing the process.

This configuration prevents a reduction of the gas leak detection accuracy due to an increase in the output of the fuel cell, which avoids an error in detecting a fuel gas leak.

The gas leak detection device may include a first pressure difference detector and a first amount estimation portion. The first pressure difference detector detects an upstream pressure in the supply passage at a position upstream of the supply-amount detector and a downstream pressure in the supply passage at a position downstream of the supply-amount detector; and the first pressure difference detector obtains a pressure difference between the upstream pressure and the downstream pressure by subtracting the downstream pressure from the upstream pressure. The first amount estimation portion estimates the amount of fuel gas flowing in the supply-amount detector, based on the pressure difference. The fuel gas leak detector may determine that an abnormality is present in the supply-amount detector, in the case where the absolute value of the difference between the amount of fuel gas estimated by the first amount estimation portion and the amount of supplied fuel gas detected by the supply-amount detector is equal to or greater than a second predetermined value.

With this configuration, an abnormality in the supply-amount detector can be easily detected. This prevents the supply-amount detector from wrongly detecting the amount of fuel gas, which improves the gas leak detection accuracy.

The fuel cell system may include a regulator which is provided in the supply passage at a position upstream or downstream of the supply-amount detector. The gas leak detection device may include a second pressure difference detector, and a second amount estimation portion. The second pressure difference detector detects an upstream pressure in the supply passage at a position upstream of the regulator and a downstream pressure in the supply passage at a position downstream of the regulator. The second pressure difference detector obtains a pressure difference between the upstream pressure and the downstream pressure by subtracting the downstream pressure from the upstream pressure. The second amount estimation portion estimates the amount of fuel gas flowing in the regulator, based on the pressure difference obtained by the second pressure difference detector. The fuel gas leak detector may determine that an abnormality is present in the supply-amount detector, when the absolute value of the difference between the amount of fuel gas estimated by the second amount estimation portion and the fuel gas supply amount detected by the supply-amount detector is equal to or greater than a third predetermined value.

With this configuration, an abnormality in the supply-amount detector can be easily detected. This prevents the supply-amount detector from wrongly detecting the amount of fuel gas, which improves the gas leak detection accuracy.

A second aspect of the invention relates to a fuel cell system. The fuel cell system includes a fuel cell, a fuel gas supply source, a supply passage, a discharge passage, a purge valve, and a supply-amount detector. Fuel gas is supplied from the fuel gas supply source to the fuel cell through the supply passage. Fuel gas is discharged from the fuel cell through the discharge passage. The purge valve is provided in the discharge passage, which adjusts the amount of fuel gas discharged from the fuel cell. The supply-amount detector is provided in the supply passage, which detects the amount of supplied fuel gas. The supply passage includes a first passage downstream of the supply-amount detector. The fuel cell includes a second passage through which the fuel gas flows. The discharge passage includes a third passage upstream of the purge valve. The fuel cell system further includes a pressure detector, a consumption-amount calculator, a change-amount calculator, a difference-amount calculator, and a fuel-gas leak detector. The pressure detector detects the pressure of the fuel gas in a gas leak detection passage including the first passage, the second passage, and the third passage. The consumption-amount calculator calculates the amount of fuel gas consumed by the fuel cell. The change-amount calculator obtains a change in the pressure of the fuel gas using the detected pressure, and calculates a change in the amount of fuel gas in the gas leak detection passage due to the change in the pressure of the fuel gas. The difference-amount calculator calculates the difference between the detected amount of supplied fuel gas and the sum of the amount of consumed fuel gas and the change in the amount of fuel gas in the gas leak detection passage by subtracting the amount of consumed fuel gas and the change in the amount of fuel gas in the gas leak detection passage from the detected amount of supplied fuel gas. The fuel-gas leak detector determines that a fuel gas leak is present in the gas leak detection passage when the difference is equal to or greater than a predetermined value.

The fuel cell system having the aforementioned configuration can accurately detects a fuel gas leak even when the pressure of the fuel gas changes in the gas leak detection passage due to a change in the operating state of the fuel cell.

The invention is not limited to the aforementioned aspects. The invention can be achieved as a control method for the gas leak detection device or the fuel cell system. Further, the invention can be achieved in the form of a computer program for the control method or the gas leak detection device, in the form of a storage medium in which the computer program is stored, in the form of data signals containing the computer program that are transmitted in a carrier wave, or the like.

When the invention is configured as the computer program, the storage medium in which the computer program is stored, or the like, the computer program may control the entire function of the aforementioned gas leak detection device, or may control only the function according to the invention.

BRIEF DESCRIPTION OF THE DRAWINGS

The foregoing and further objects, features and advantages of the invention will become apparent from the following description of exemplary embodiments with reference to the accompanying drawings, wherein the same reference numbers are used to identify similar elements and wherein:

FIGS. 6B and 6C show a flowchart showing the hydrogen leak detection process according to the second embodiment;

DETAILED DESCRIPTION OF THE EXEMPLARY EMBODIMENTS

Hereinafter, embodiments of the invention will be described in the following order.

A. First Embodiment

Figure 1:
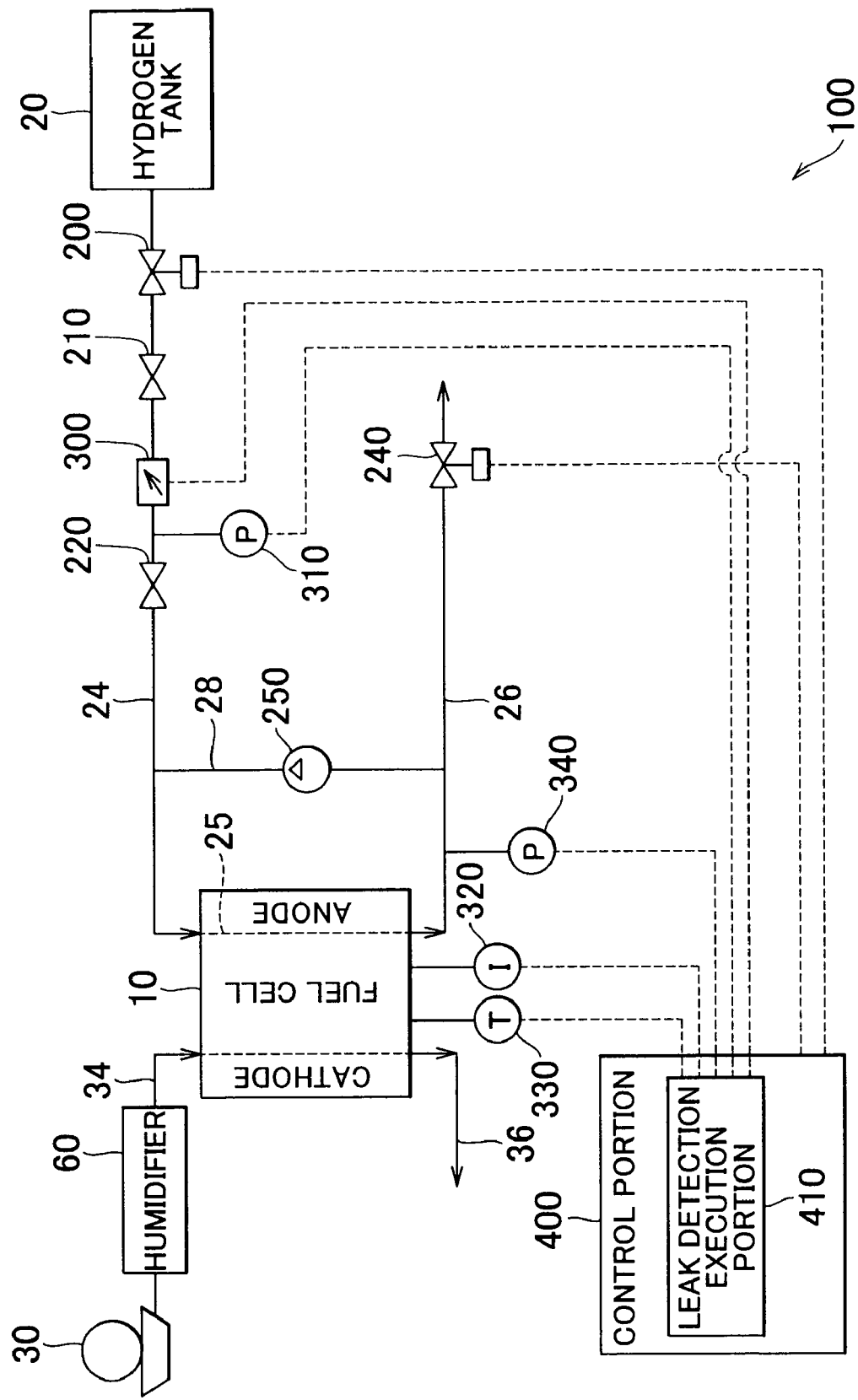
FIG. 1 is a block diagram showing the configuration of a fuel cell system 100 according to a first embodiment of the invention.

A1. Entire configuration of gas leak detection device
A2. Hydrogen leak detection process B. Second Embodiment C. Third Embodiment D. Modified Example A. First embodiment A. Entire Configuration of Fuel Cell System FIG. 1 is a block diagram showing the configuration of a fuel cell system 100 according to a first embodiment of the invention. The fuel cell system 100 includes a fuel cell 10, a hydrogen tank 20, a hydrogen flow meter (hereinafter, referred to as "HFM") 300, pressure detectors 310 and 340, an electric current sensor 320, a temperature sensor 330, a blower 30, a control portion 400, a humidifier 60, and a circulation pump 250.

The fuel cell 10 is a polymer electrolyte fuel cell. The fuel cell has a stack structure in which a plurality of cells (not shown) are stacked. In each cell, a hydrogen electrode (not shown: hereinafter, referred to as "anode") is provided on one side of an electrolyte membrane (not shown), and an oxygen electrode (not shown: hereinafter, referred to as "cathode") is provided on the other side of the electrolyte membrane. Fuel gas containing hydrogen is supplied to the anode of each cell, and oxidizing gas containing oxygen is supplied to the cathode. This causes an electrochemical reaction to proceed, which generates electromotive force. The electric power generated in the fuel cell 10 is supplied to a predetermined load (not shown) connected to the fuel cell 10. Although the invention is described in connection with a polymer electrolyte fuel cell, it may be used in the context of other fuel cells such as, for example, a fuel cell with a hydrogen separation membrane, an alkali aqueous solution electrolyte fuel cell, a phosphoric acid electrolyte fuel cell, a molten carbonate electrolyte fuel cell, etc. A passage through which fuel gas flows in the fuel cell 10 will be referred to as "fuel gas passage 25".

The blower 30 supplies the cathode of the fuel cell 10 with air that serves as the oxidizing gas. The blower 30 is connected to the cathode of the fuel cell 10 via a cathode gas supply passage 34. The humidifier 60 is provided in the cathode gas supply passage 34. Air from the blower 30 is humidified by the humidifier 60. Then, the air is supplied to the fuel cell 10. A cathode discharge gas passage 36 is provided in the fuel cell 10. After the electrochemical reaction occurs, discharge gas (hereinafter, referred to as "cathode discharge gas") is discharged from the cathode to the atmosphere through the cathode discharge gas passage 36.

Hydrogen gas is stored under high-pressure in the hydrogen tank 20. The hydrogen tank 20 is connected to the fuel gas passage 25 of the fuel cell 10 through the fuel gas supply passage 24. In the fuel gas supply passage 24, a cut-off valve 200, a first regulator 210, the HFM 300, and a second regulator 220 are provided, in the order stated, going from the hydrogen tank 20 to the fuel cell 10. When the cut-off valve 200 is closed, it cuts off the supply of hydrogen gas (i.e., the fuel gas) from the hydrogen tank 20, and when opened, it allows hydrogen gas to flow from the hydrogen tank 20. A control portion 400 (described later) controls the cut-off valve 200. After the high-pressure hydrogen gas is supplied from the hydrogen tank 20 to the fuel gas supply passage 24, the first regulator 210 makes an initial adjustment to the pressure of the fuel gas. After the fuel gas passes through the HFM 300, the second regulator 220 makes a second adjustment to the pressure of the fuel gas. Then, the fuel gas is then supplied to the anode of the fuel cell 10. The target values of the first pressure adjustment and the second pressure adjustment are appropriately set according to the design of the fuel cell system 100.

The HFM 300 measures the amount of fuel gas flowing per unit time (hereinafter, referred to as "unit time fuel gas amount") after the first regulator 210 makes the initial pressure adjustment in the fuel gas supply passage 24. The unit time fuel gas amount is expressed in Nl/min (i.e., expressed in terms of a standard state). The unit time fuel gas amount measured by HFM 300 is transmitted to a leak detection execution portion 410 (described later).

In the fuel gas supply passage 24, a pressure detector 310 is provided between HFM 300 and the second regulator 220. The pressure detector 310 measures the pressure value (Pa: pascal) of the fuel gas after the first regulator 210 makes the initial pressure adjustment. The pressure value measured by the pressure detector 310 is transmitted to the leak detection execution portion 410 (described later). The fuel gas supply passage 24 can be regarded as the supply passage according to the invention.

The hydrogen tank 20 can be regarded as the fuel gas supply source according to the invention. However, instead of the hydrogen tank 20, a reforming device may be provided. The reforming device generates hydrogen by reforming alcohol, hydrocarbon, aldehyde, or the like, and supplies the hydrogen to the fuel gas passage 25 through the cut-off valve 200 or the like.

The fuel gas passage 25 of the fuel cell 10 is connected to the fuel gas discharge gas passage 26. A purge valve 240 is provided in the fuel gas discharge gas passage 26. When the fuel cell system 100 is operating, fuel gas is discharged from the anode after the fuel gas is used in electrochemical reaction. The fuel gas is discharged (purged) from the purge valve 240 to the atmosphere through the fuel gas discharge gas passage 26 at given time intervals, for the following reason. When the fuel cell system 100 is operating, the fuel gas may contain unnecessary gas, i.e., gas other hydrogen. An example of an unnecessary gas is nitrogen, which flows to the anode from the cathode through the electrolyte membrane. Unnecessary gas is circulated in the fuel cell system 100 without being consumed, as described later. This gradually increases the concentration of unnecessary gas in the fuel gas, which reduces the electric power generation efficiency of the fuel cell 10. Thus, the control portion 400 (described later) controls the purge valve 240 to discharge the fuel gas containing unnecessary gas at given time intervals. The fuel gas discharge gas passage 26 can be regarded as the discharge passage according to the invention. The purge valve 240 can be regarded as the purge valve according to the invention.

The fuel gas may also contain other unnecessary gases other than nitrogen when a fuel cell other than the hydrogen separation membrane fuel cell is used as the fuel cell 10, or when the fuel cell 10 is used in a certain environment.

One end of a gas circulation passage 28 is connected to the fuel gas discharge passage 26 at a position upstream of the purge valve 240 in the direction in which the fuel gas is discharged from the fuel cell 10 (hereinafter, referred to as "the gas discharge direction"). The other end of the gas circulation passage 28 is connected to the fuel gas supply passage 24. A circulation pump 250 is provided in the gas circulation passage 28. The circulation pump 250 delivers the fuel gas under pressure to the fuel gas supply passage 24 through the gas circulation passage 28. The fuel gas is circulated through the gas circulation passage 28. Thus, hydrogen gas contained in the fuel gas that is discharged from the anode is circulated, and is reused. The control portion 400 (described later) controls the circulation pump 250. The gas circulation passage 28 can be regarded as the circulation passage according to the invention. The circulation pump 250 can be regarded as the circulation pump according to the invention. Hereinafter, the fuel gas supply passage 24, fuel gas passage 25, fuel gas discharge passage 26, and gas circulation passage 28 will be collectively referred to as "anode system passages".

A pressure detector 340 is provided in the fuel gas discharge passage 26 at a position between where the fuel gas passage 25 joins to the fuel gas discharge passage 26 and where the fuel gas discharge passage 26 is joined to the gas circulation passage 28. The pressure detector 340 measures the pressure value (Pa:pascal) of the fuel gas flowing from the fuel gas passage 25. The pressure value measured by the pressure detector 340 is transmitted to the leak detection execution portion 410 (described later).

Further, the fuel cell 10 is provided with the electric current sensor 320 that measures the value of electric current (A: ampere) generated by the fuel cell 10. The fuel cell 10 is provided with temperature sensor 330 that measures the operating temperature of the fuel cell (this operating temperature is estimated to be almost the same as the temperature of each cell. Therefore, hereinafter, the operating temperature will be referred to as "cell temperature T" (K: Kelvin)). The electric current value measured by the electric current sensor 320 and the cell temperature value measured by the temperature sensor 330 are transmitted to the leak detection execution portion 410 (described later). The temperature sensor 330 measures the typical temperature of the fuel cell 10 at a given portion. For example, the temperature sensor 330 measures the temperature of the fuel cell 10 at a coolant outlet (not shown) from which coolant supplied to the fuel cell 40 is discharged.

The control portion 400 is configured as a logic circuit that includes a microcomputer. More specifically, the control portion 400 includes CPU (not shown), ROM (not shown), RAM (not shown), input/output ports, and the like. CPU executes predetermined calculations according to preset control programs. Control programs, control data, and the like that are required to execute calculations are stored in ROM. Data required for CPU to execute calculations is temporarily read and written into RAM. Signals are input to and output from the input/output ports. The control portion 400 obtains information concerning a load request and the like, and outputs drive signals to devices constituting the fuel cell system 100 such as the blower 30, humidifier 60, cut-off valve 200, circulation pump 250, and purge valve 240. Thus, the control portion 400 controls these devices taking into account the operating state of the entire fuel cell system 100.

The control portion 400 functions as the leak detection execution portion 410. The leak detection execution portion 410 receives the measured values from the HFM 300, pressure detector 310, electric current sensor 320, temperature sensor 330, and pressure detector 340. Thus, the leak detection execution portion 410 executes a hydrogen leak detection process described later.

Figure 2:
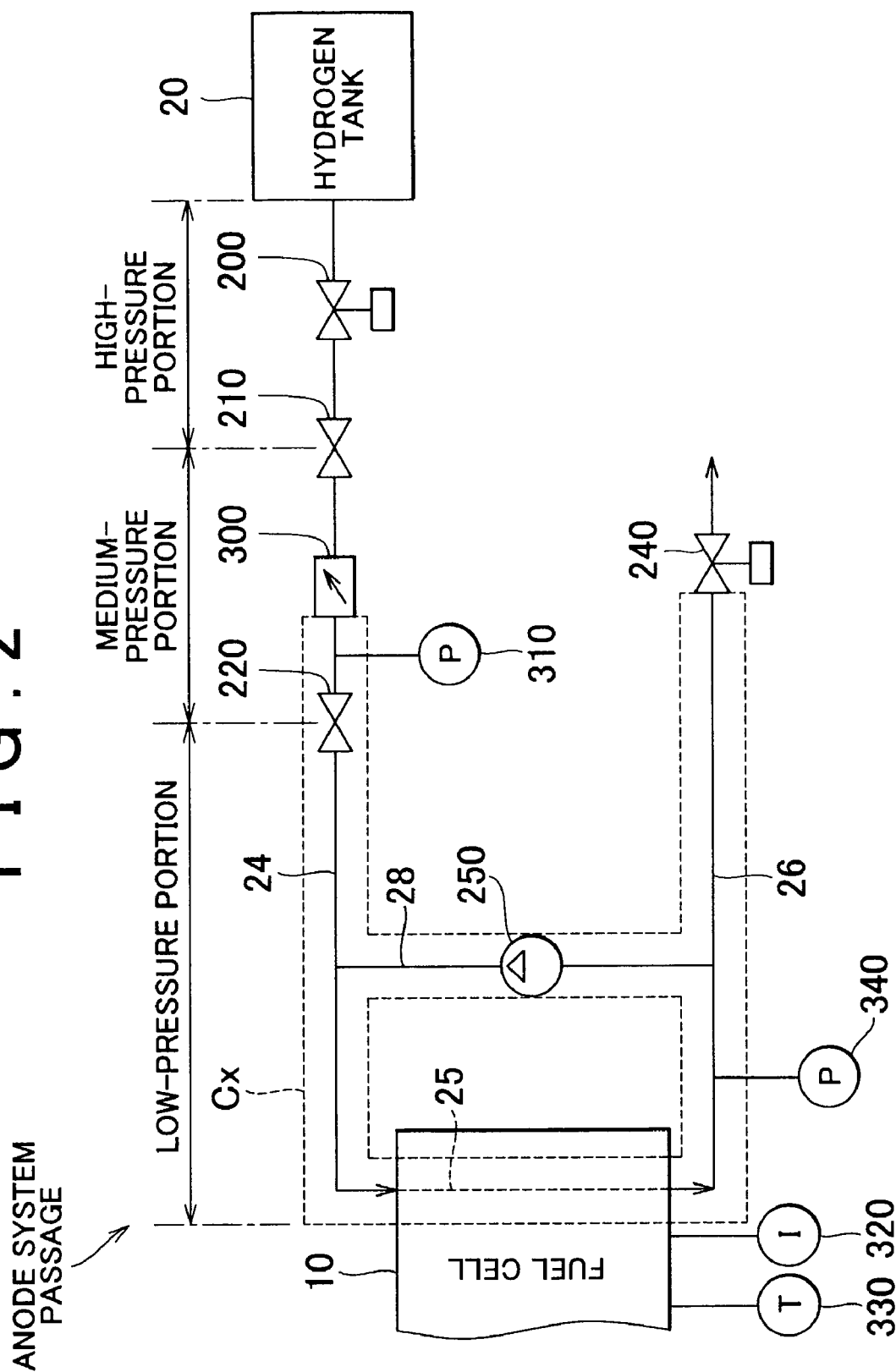
FIG. 2 is an explanatory diagram showing the enlarged portion of anode system passages in the first embodiment of the invention.

FIG. 2 is an explanatory diagram showing the enlarged anode system passages in this embodiment. As shown in FIG. 2, in this embodiment, a portion of the fuel gas supply passage 24 upstream of the first regulator 210 in the direction in which fuel gas is supplied to the fuel cell 10 (hereinafter, referred to as "the gas supply direction") may be referred to as "high-pressure portion" because the pressure in this portion is high in the anode system passages. A portion of the fuel gas supply passage 24 between the first regulator 210 and the second regulator 220 may be referred to as "medium-pressure portion". The pressure in the medium-pressure portion is lower than the pressure in the high-pressure portion, because the medium-pressure portion is positioned downstream of the first regulator 210. A portion of the fuel gas supply passage 24 downstream of the second regulator 220 in the gas supply direction may be referred to as "low-pressure portion". The pressure in the low-pressure portion is lower than the pressure in the medium-pressure portion because the low-pressure portion is positioned downstream of the second regulator 220.

Passages surrounded by dashed lines in FIG. 2 may be referred to as "leak detection passage Cx". That is, the leak detection passage Cx includes a portion of the fuel gas supply passage 24 downstream of the HFM 300 in the gas supply direction, the fuel gas passage 25, a portion of the fuel gas discharge passage 26 upstream of the purge valve 240 in the gas discharge direction, and the gas circulation passage 28.

The pressure value measured by the pressure detector 340 is regarded as the typical pressure value in the low-pressure portion in the leak detection passage Cx. The pressure value measured by the pressure detector 310 is regarded as the typical pressure value in the medium-pressure portion in the leak detection passage Cx.

However, because hydrogen gas (fuel gas) is highly flammable, the hydrogen gas leak detection process has been conventionally executed on the assumption that hydrogen gas may leak from the anode system passages and the like. Accordingly, in this embodiment, when the fuel cell 10 is operating, the hydrogen leak detection process is executed in order to detect the leak of hydrogen gas from the leak detection passage Cx in the anode system passages shown in FIG. 2. Hereinafter, the hydrogen leak detection process will be described.

Figure 3:
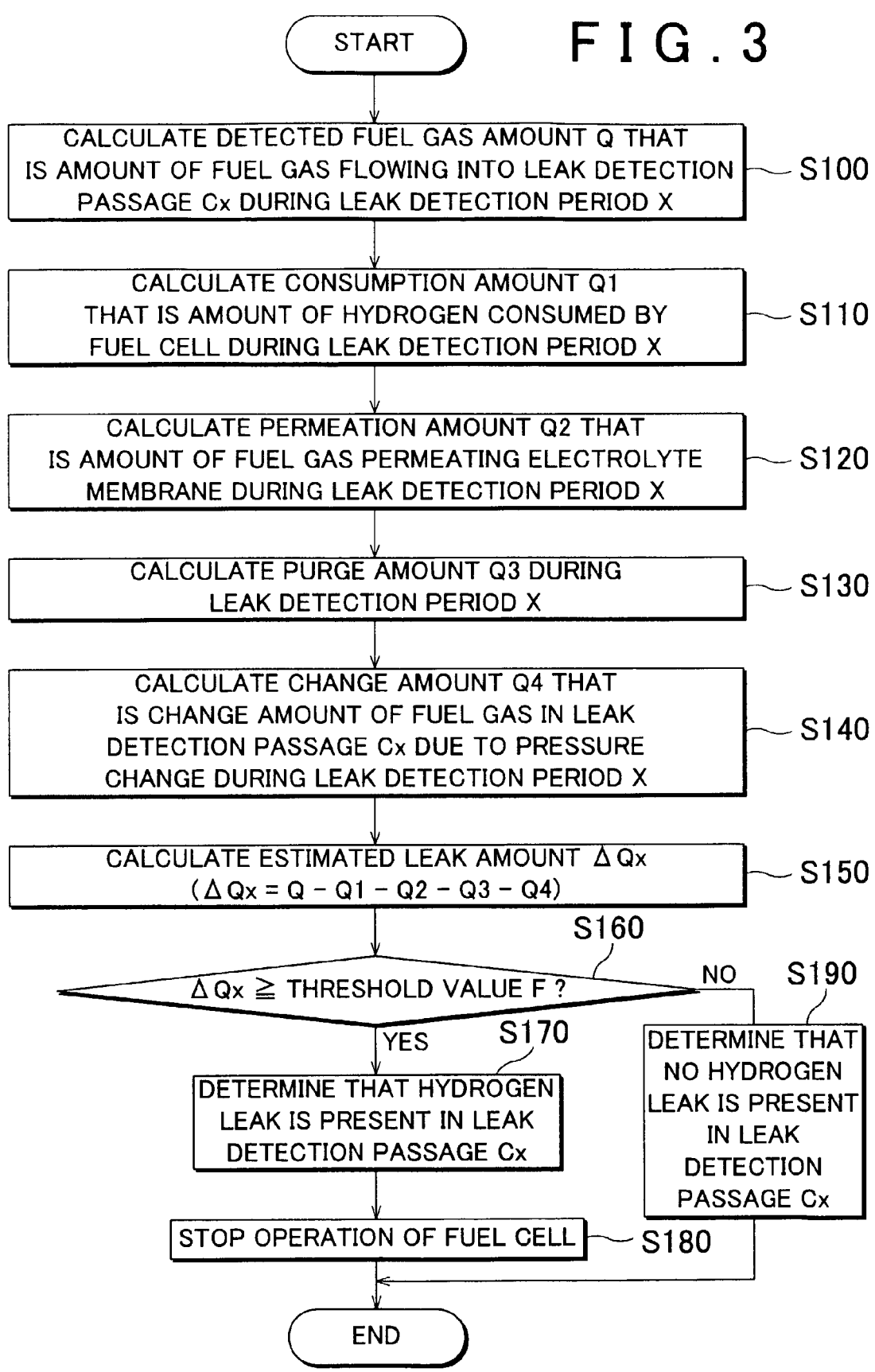
FIG. 3 is a flowchart showing a hydrogen leak detection process according to the first embodiment.

FIG. 3 is a flowchart showing the hydrogen leak detection process in this embodiment. The hydrogen leak detection process in this embodiment is executed at time points at predetermined intervals (hereinafter, referred to as "leak detection time points") when the fuel cell 10 is operating. In the hydrogen leak detection process, it is determine whether hydrogen leaks in the leak detection passage Cx during a period of $\alpha$ seconds after the leak detection time point is reached. Hereinafter, the period of $\alpha$ seconds may be referred to as "leak detection period X" because the leak detection is executed during this period. That is, the hydrogen leak detection process is executed on the assumption that the cut-off valve 200 is open and hydrogen gas (fuel gas) is supplied from the hydrogen tank 20 to the fuel gas supply passage 24. In a second embodiment, the hydrogen leak detection process is executed on the same assumption.

In this hydrogen leak detection process, the amount of fuel gas flowing into the leak detection passage Cx (hereinafter, referred to as "detected fuel gas amount Q") is calculated based on the unit time fuel gas amount detected by the HFM 300 during the leak detection period X. Also, the amount of fuel gas (hydrogen gas) consumed by the fuel cell 10 in the course of generating electric power (hereinafter, referred to as "consumption amount Q1"), the amount of fuel gas (hydrogen gas) flowing from the fuel gas passage 25 to the cathode through the electrolyte membrane of the fuel cell 10 (hereinafter, referred to as "permeation amount Q2"), and the amount of fuel gas discharged (purged) from the leak detection passage Cx through the purge valve 240 (hereinafter, referred to as "purge amount Q3") are calculated during the leak detection period X. Further, in this embodiment, the change in the amount of fuel gas in the leak detection passage Cx during the leak detection period X (i.e., from the start to the end of the leak detection period) is detected. In other words, the change in the amount of fuel gas in the leak detection passage Cx due to the change in the pressure of fuel gas in the leak detection passage Cx during the leak detection period X is detected. Hereinafter, the change in the amount of fuel gas in the leak detection passage Cx will be referred to as "change amount Q4". The detected fuel gas amount Q includes the consumption amount Q1, permeation amount Q2, purge amount Q3, and change amount Q4. Therefore, by subtracting the consumption amount Q1, permeation amount Q2, purge amount Q3, and change amount Q4 from the detected fuel gas amount Q, the estimated amount of leaking fuel gas (hereinafter, referred to as "estimated leak amount $\Delta Qx$") is calculated. Next, by comparing the estimated leak amount to a predetermined threshold value, the leak detection execution portion 410 determines whether a hydrogen leak is present in the leak detection passage Cx.

As described above, the change amount Q4 is the change in the amount of fuel gas in the leak detection passage Cx due to the change in the pressure in fuel gas in the leak detection passage Cx during the leak detection period X (i.e., from the start to the end of the leak detection period X). The amount of fuel gas flowing into the leak detection passage Cx increases or decreases, for example, a) in the case where the fuel gas is discharged by opening the purge valve 24, and thus the pressure in the leak detection passage Cx sharply changes during the leak detection period X, or b) in the case where the pressure in the leak detection passage Cx at the end of the leak detection period X is adjusted to be lower than the pressure in the leak detection passage Cx at the start of the leak detection period X due to the pressure adjustment characteristics of the first and second regulators 210 and 220.

In the hydrogen leak detection process, first, the leak detection execution portion 410 calculates the detected fuel gas amount Q (Nl) during the leak detection period X (step S100).

More specifically, the leak detection execution portion 410 continues to obtain the unit time fuel gas amount from HFM 300 during the leak detection period X, and calculates the detected fuel gas amount Q (Nl) by accumulating the unit time fuel gas amounts.

The leak detection execution portion 410 calculates the consumption amount Q1 during the leak detection period X (step S110). More specifically, the leak detection execution portion 410 receives, from the electric current sensor 320, an average electric current value Iav (A) that is the average value of electric current generated by the fuel cell 10. The leak detection execution portion 410 calculates the consumption amount Q1 during the leak detection period X ($\alpha$ seconds) using the average electric current value Iav and the number of cells Nc in the fuel cell 10, according to an equation (1) described below. The consumption amount Q1 calculated according to the equation (1) is expressed in terms of the standard state:

$$Q1 = \int_{t}^{t+\alpha} \frac{Iav}{96485} \times \frac{Nc}{2} \times 22.4 \, dt (Nl) \tag{1}$$

Further, the leak detection execution portion 410 calculates the permeation amount Q2 (Nl) during the leak detection period X (step S120).

Figure 4:
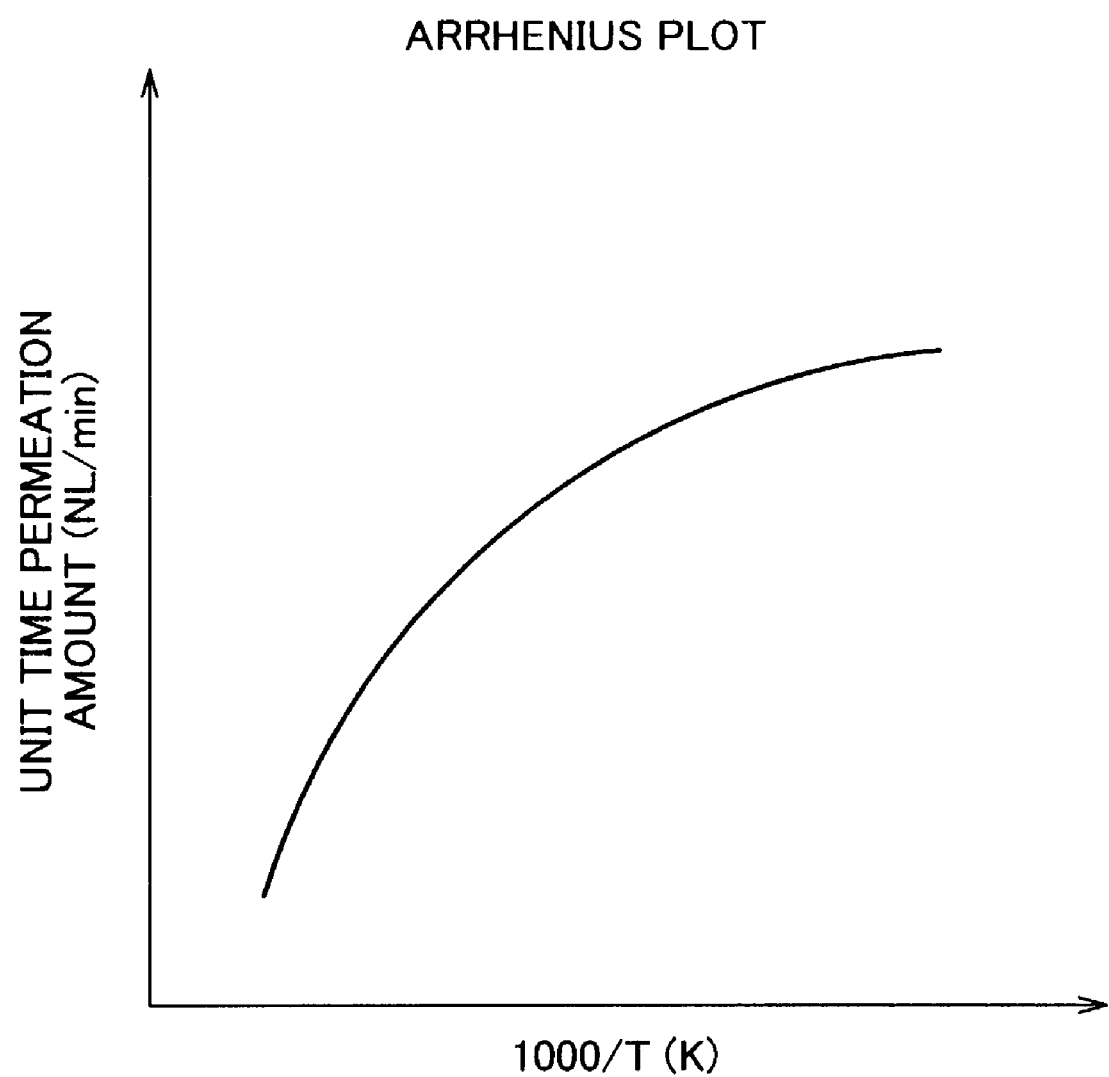
FIG. 4 is a diagram explaining an Arrhenius plot showing the relation between a unit time permeation hydrogen amount and a cell temperature.

FIG. 4 is a diagram explaining an Arrhenius plot showing the relation between a unit time permeation amount and a cell temperature. The Arrhenius plot in FIG. 4 shows the relation between the cell temperature T (K) and the unit time permeation amount (Nl/min), that is, the amount of fuel gas (hydrogen gas) permeating the electrolyte membrane per unit time (min). The Arrhenius plot is empirically determined using a fuel cell that includes the same electrolyte membrane as that of the fuel cell 10 (for example, the electrolyte membrane whose membrane pressure, material, size, and the like are the same as those of the electrolyte membrane of the fuel cell 10 and the like), in the situation where the fuel cell 10 is actually operated.

More specifically, the leak detection execution portion 410 receives, from the temperature sensor 330, an average cell temperature Tav (K) during the leak detection period X. The leak detection execution portion 410 obtains the unit time permeation amount Q2a based on the average cell temperature Tav using the Arrhenius plot (FIG. 4). Then, the leak detection execution portion 410 calculates the permeation amount Q in the standard state using an equation (2) described below.

$$Q2 = \frac{Q2a}{60} \times \alpha (Nl) \tag{2}$$

Next, the leak detection execution portion 410 calculates the purge amount Q3 (Nl) during the leak detection period X (step S130). More specifically, the leak detection execution portion 410 continues to receive the pressure (readings) in the low-pressure portion in the leak detection passage Cx (hereinafter, referred to as "low-pressure portion pressure P1") from the pressure detector 340, and the cell temperature T (readings) from the temperature sensor 330 during the leak detection period X. Hereinafter, the low-pressure portion pressure P1 detected at time point t during the leak detection period X will be referred to as "instantaneous low-pressure portion pressure P1(t)". The cell temperature T detected at time point t during the leak detection period X will be referred to as "instantaneous cell temperature T (t)". The leak detection execution portion 410 calculates an instantaneous purge amount Q3a (t) at time point t during the leak detection period X according to an equation (3) described below. Then, the leak detection execution portion 410 calculates the purge amount Q3 based on the instantaneous purge amount Q3a(t) according to an equation (4) described below. In the equation (3), S represents an effective cross sectional area of the purge valve 24 when gas is discharged, and Pg represents an atmospheric pressure. Also, the instantaneous purge amount Q3a (t) is expressed in terms of the standard state. Therefore, the purge amount Q3 is expressed in terms of the standard state:

$$Q3a(t) = 226.3 \times S \times \sqrt{Pg(Pl(t) - Pg)} - \sqrt{\frac{273}{T(t)}} \, (Nl/min) \tag{3}$$

$$Q3 = \int_{t}^{t+\alpha} \frac{Q3a(t)}{60} \, dt (Nl) \tag{4}$$

Subsequently, the leak detection execution portion 410 calculates the change amount Q4 (Nl) during the leak detection period X (step S140). As described above, the leak detection passage Cx includes the low-pressure portion and the medium-pressure portion. The pressure of fuel gas in the low-pressure portion is different from that in the medium-pressure portion due to the pressure adjustment executed by the second regulator 220. Therefore, when the pressure in the leak detection passage Cx changes, the value of change in the pressure in the low-pressure portion is different from that in the medium-pressure portion. Thus, the leak detection execution portion 410 calculates the change in the amount of fuel gas in each of the low-pressure portion and the medium-pressure portion of the leak detection passage X due to the change in the pressure during the leak detection period X. Then, the leak detection execution portion 410 calculates the change amount Q4 by summing the changes in the amounts of fuel gas in the low-pressure portion and in the medium-pressure portion. Hereinafter, the change in the amount of fuel gas in the low-pressure portion due to the change in the pressure in the low-pressure portion will be referred to as "low-pressure portion change amount Q4a (Nl)". The change in the amount of fuel gas in the medium-pressure portion due to the change in the pressure in the medium-pressure portion will be referred to as "medium-pressure portion change amount Q4b (Nl)".

More specifically, in step S140, the leak detection execution portion 410 receives, from the pressure detector 340, the pressure in the low-pressure portion at the start of the leak detection period X (hereinafter, referred to as "low-pressure portion start time pressure Pls"). Also, the leak detection execution portion 410 receives, from the pressure detector 340, the pressure in the low-pressure portion at the end of the leak sensor X (hereinafter, referred to as "low-pressure portion end time pressure Ple"). The leak detection execution portion 410 receives, from the pressure detector 310, the pressure in the medium-pressure portion at the start of the leak detection period. X (hereinafter, referred to as "medium-pressure portion start time pressure Pms"). Also, the leak detection execution portion 410 receives, from the pressure detector 310, the pressure in the medium-pressure portion at the end of the leak detection period X (hereinafter, referred to as "medium-pressure portion end time pressure Pme"). The leak detection execution portion 410 calculates a pressure change value ΔP1 in the low-pressure portion during the leak detection period X by subtracting the low-pressure portion end time pressure Ple from the low-pressure portion start time pressure Pls. The leak detection execution portion 410 calculates the low-pressure portion change amount Q4a (Nl) based on the pressure change value ΔP1 according to an equation (55 described below. The equation (5) is derived from the gas state equation. Similarly, the leak detection execution portion 410 calculates a pressure change value ΔP2 in the medium-pressure portion during the leak detection period X by subtracting the medium-pressure portion end time pressure Pme from the medium-pressure portion start time pressure Pms. The leak detection execution portion 410 calculates the medium-pressure portion change amount Q4$b$ (Nl) based on the pressure change value ΔP2 according to an equation (6) described below. The equation (6) is derived from the gas state equation. The leak detection execution portion 410 calculates the change amount Q4 by summing the low-pressure portion change amount Q4$a$ and the medium-pressure portion change amount Q4$b$, as shown in an equation (7) described below. In the equation (5), V1 represents a volume of the low-pressure portion of the leak detection passage Cx. In the equation (6), V2 represents a volume of the medium-pressure portion of the leak detection passage Cx. The values of V1 and V2 are set in advance according to the design of the fuel cell system 100 or the like. In the equations (5) and (6), Z represents a known compression coefficient.

$$Q4a = \frac{\Delta P1 \times V1}{100 \times Z}(Nl) \quad (5)$$

$$Q4b = \frac{\Delta P2 \times V2}{100 \times Z}(Nl) \quad (6)$$

$$Q4 = Q4a + Q4b (Nl) \quad (7)$$

The leak detection execution portion 410 calculates the estimated leak amount ΔQx (Nl) (step S150). More specifically, as shown in an equation (8) described below, the leak detection execution portion 410 calculates the estimated leak amount ΔQx by subtracting the consumption amount Q1, the permeation amount Q2, the purge amount Q3, and the change amount Q4 from the detected fuel gas amount Q.

$$\Delta Qx = Q - Q1 - Q2 - Q3 - Q4 (Nl) \quad (8)$$

Subsequently, the leak detection execution portion 410 determines whether a hydrogen gas leak is present in the leak detection passage Cx using the estimated leak amount ΔQx. That is, the leak detection execution portion 410 compares the estimated leak amount ΔQx with a predetermined threshold value F. When the estimated leak amount ΔQx is equal to or greater than the threshold value F (YES in step S160), the leak detection execution portion 410 determines that a hydrogen gas leak is present in the leak detection passage Cx (that is, a hydrogen gas leak is detected) (step S170), and stops the operation of the fuel cell 10 (step S180). This prevents the waste of hydrogen gas due to the hydrogen gas leak. In this case, the estimated leak amount ΔQx shows the amount of hydrogen gas that leaks in the leak detection passage Cx.

The leak amount ΔQQ per unit time (Nl/min) can be calculated using the leak amount (that is equivalent to the estimated leak amount ΔQx in this case), according to an equation (9) described below.

$$\Delta QQ = \frac{\Delta Qx}{\alpha}(Nl/min) \quad (9)$$

When the estimated leak amount ΔQx is less than the threshold value F (NO in step S160), the leak detection execution portion 410 determines that a hydrogen gas leak is not present in the leak detection passage Cx (step S190).

After executing step S180 and S190, the leak detection execution portion 410 finishes the hydrogen gas leak detection process.

Thus, in the hydrogen gas leak detection process in this embodiment, the leak detection execution portion 140 determines whether a hydrogen gas leak is present in the leak detection passage Cx based on the estimated leak amount ΔQx that is calculated using the change amount Q4. Accordingly, even in the case where the pressure changes in the leak detection passage Cx during the leak detection period X (that is, even in the case where the condition is unsteady in the leak detection passage Cx), a hydrogen gas leak can be accurately detected.

As described above, the leak detection passage Cx includes the low-pressure portion and the medium-pressure portion, and the pressure of fuel gas in the low-pressure portion is different from that in the medium-pressure portion due to the pressure adjustment performed by the second regulator 220. Therefore, when the pressure changes in the leak detection passage Cx, the pressure change value in the low-pressure portion is different from that in the medium-pressure portion. Thus, in the hydrogen gas leak detection process in this embodiment, the pressure change values ΔP1 and ΔP2 in the low-pressure portion and in the medium-pressure portion of the leak detection passage Cx are obtained. The low-pressure portion change amount Q4$a$ and the medium-pressure portion change amount Q4$b$ are calculated using the pressure change values ΔP1 and ΔP2. Then, the change amount Q4 is obtained by summing the low-pressure portion change amount Q4$a$ and the medium-pressure portion change amount Q4$b$. With this configuration, the change amount Q4 can be obtained taking into account distribution of pressure in the leak detection passage Cx (pressure distribution). Therefore, the change amount Q4 can be accurately calculated. As a result, a hydrogen gas leak can be accurately detected in the leak detection passage Cx.

In the hydrogen gas leak detection process in this embodiment, the leak detection execution portion 410 determines whether a hydrogen gas leak is present in the leak detection passage Cx based on the estimated leak amount ΔQx that is calculated using the permeation amount Q2. Therefore, a hydrogen gas leak can be accurately detected.

In the hydrogen gas leak detection process in this embodiment, the leak detection execution portion 410 determines whether a hydrogen gas leak is present in the leak detection passage based on the estimated leak amount ΔQx that is calculated using the purge amount Q3. Therefore, even in the case where the fuel gas is discharged from the purge valve 240 during the leak detection period, a hydrogen gas leak can be accurately detected.

The leak detection execution portion 410 in this embodiment can be regarded as the supply-amount detector, the consumption-amount calculator, the difference-amount calculator, and the hydrogen gas leak detector.

B. Second Embodiment

Figure 5:
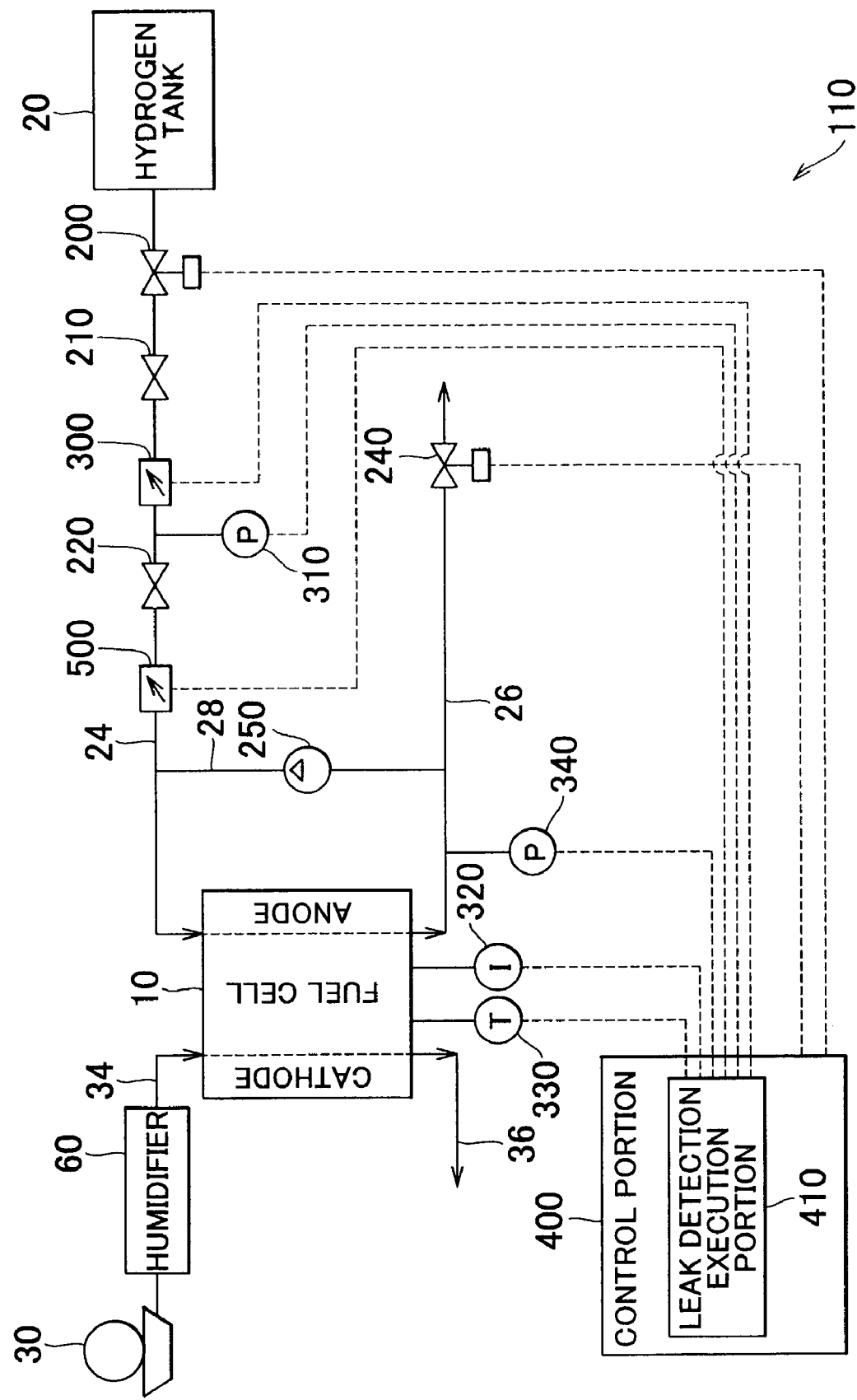
FIG. 5 is a block diagram showing the configuration of a fuel cell system 110 according to a second embodiment of the invention.

Next, a second embodiment will be described. FIG. 5 is a block diagram showing the configuration of a fuel cell system 110 according to the second embodiment of the invention.

Basically, the fuel cell system 110 according to the second embodiment has the same configuration as that of the fuel cell system 100 in the first embodiment, except that HFM 500, which differs from HFM 300 is provided in the fuel gas supply passage 24 at a position downstream of the second regulator 220 and upstream of where the fuel gas supply passage 24 is joined to the gas circulation passage 28 in the gas supply direction. The HFM 500 measures the unit time fuel gas amount after the second regulator 220 makes the second pressure adjustment. The leak detection execution portion 410 receives the unit time fuel gas amount from the HFM 500. The leak detection execution portion 410 executes the hydrogen leak detection process and the preparation process in the second embodiment.

Figure 6A:
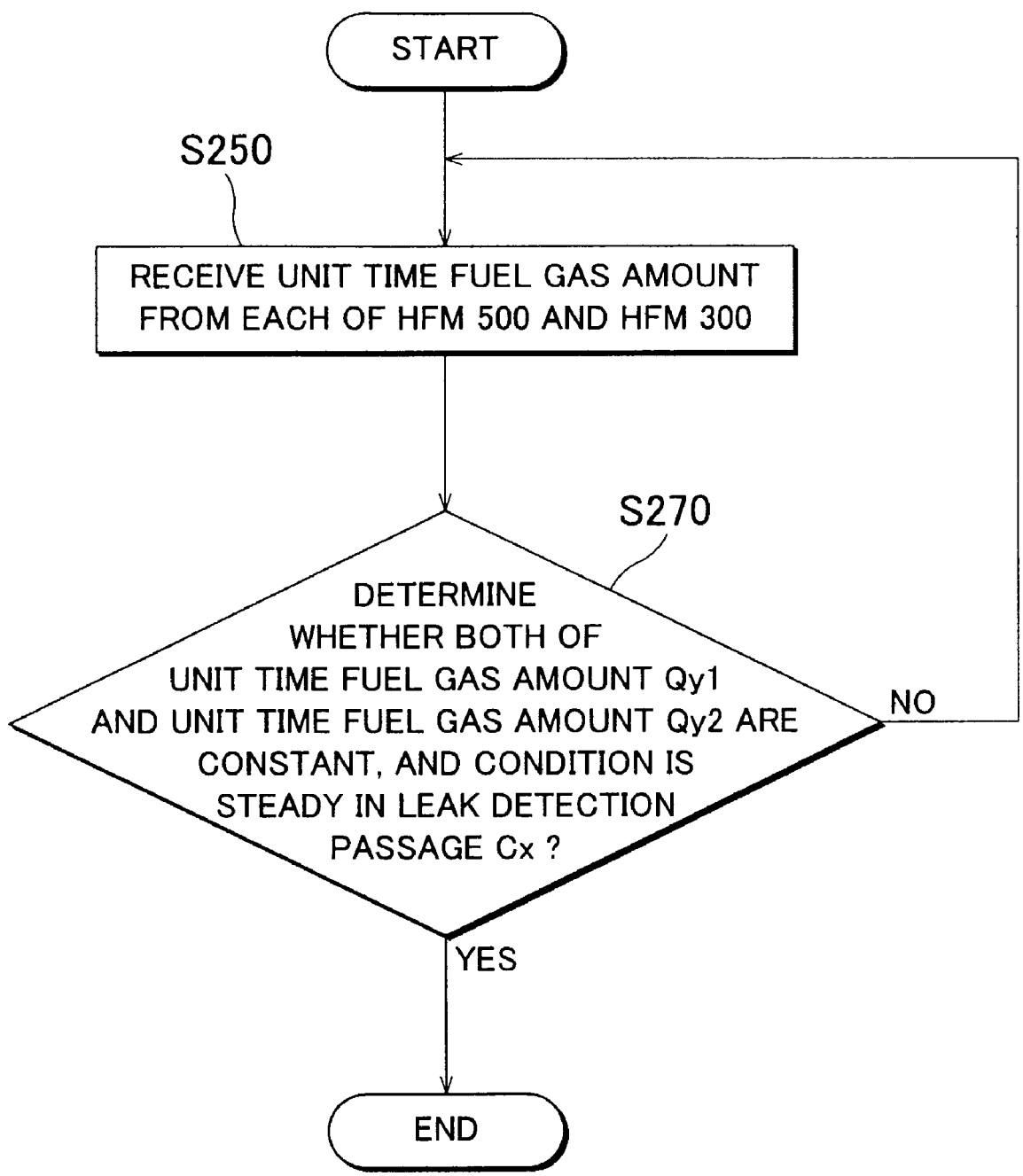
FIG. 6A is a flowchart showing a preparation process for a hydrogen leak detection process in the second embodiment.
Figure 6B:
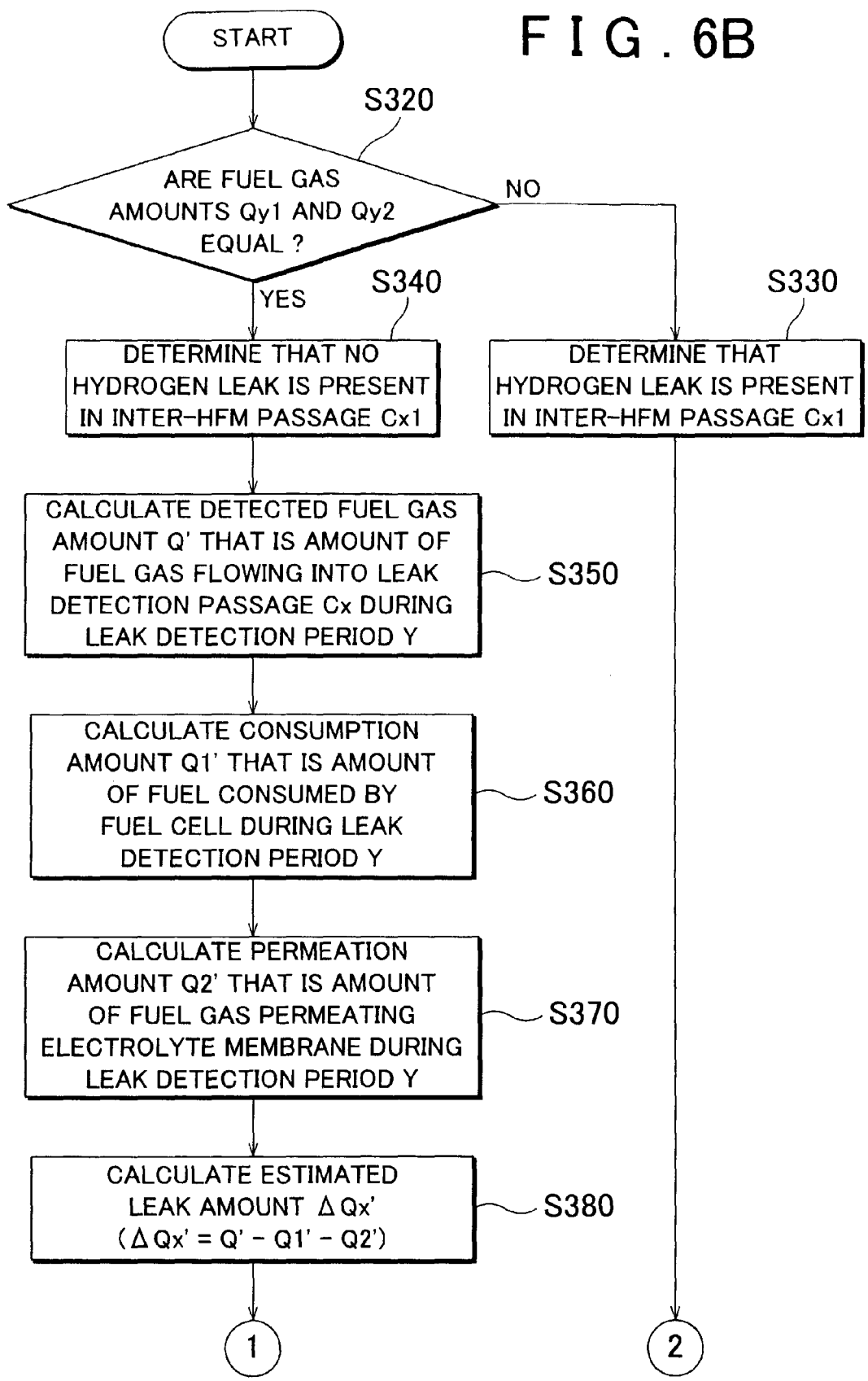

FIG. 6A is a flowchart showing the preparation process for the hydrogen leak detection process. FIGS. 6B and 6C show a flowchart showing the hydrogen leak detection process according to the second embodiment.

In the fuel cell system 100 according to the first embodiment, a hydrogen leak is detected even in the case where the pressure changes in the leak detection passage (that is, even in the case where the condition is unsteady in the leak detection passage). According to the second embodiment, the hydrogen leak detection process (FIGS. 6B and 6C) and the preparation process (FIG. 6A) are executed in addition to the hydrogen leak detection process executed in accordance with the first embodiment. For example, the hydrogen leak detection process shown in FIG. 3 is executed in the case where the condition is unsteady in the leak detection passage. For example, the hydrogen leak detection process shown in FIGS. 6B and 6C is executed in the case where the condition is steady in the leak detection passage. Hereinafter, the hydrogen leak detection process and the preparation process for the hydrogen leak detection process in the second embodiment will be described.

Figure 7:
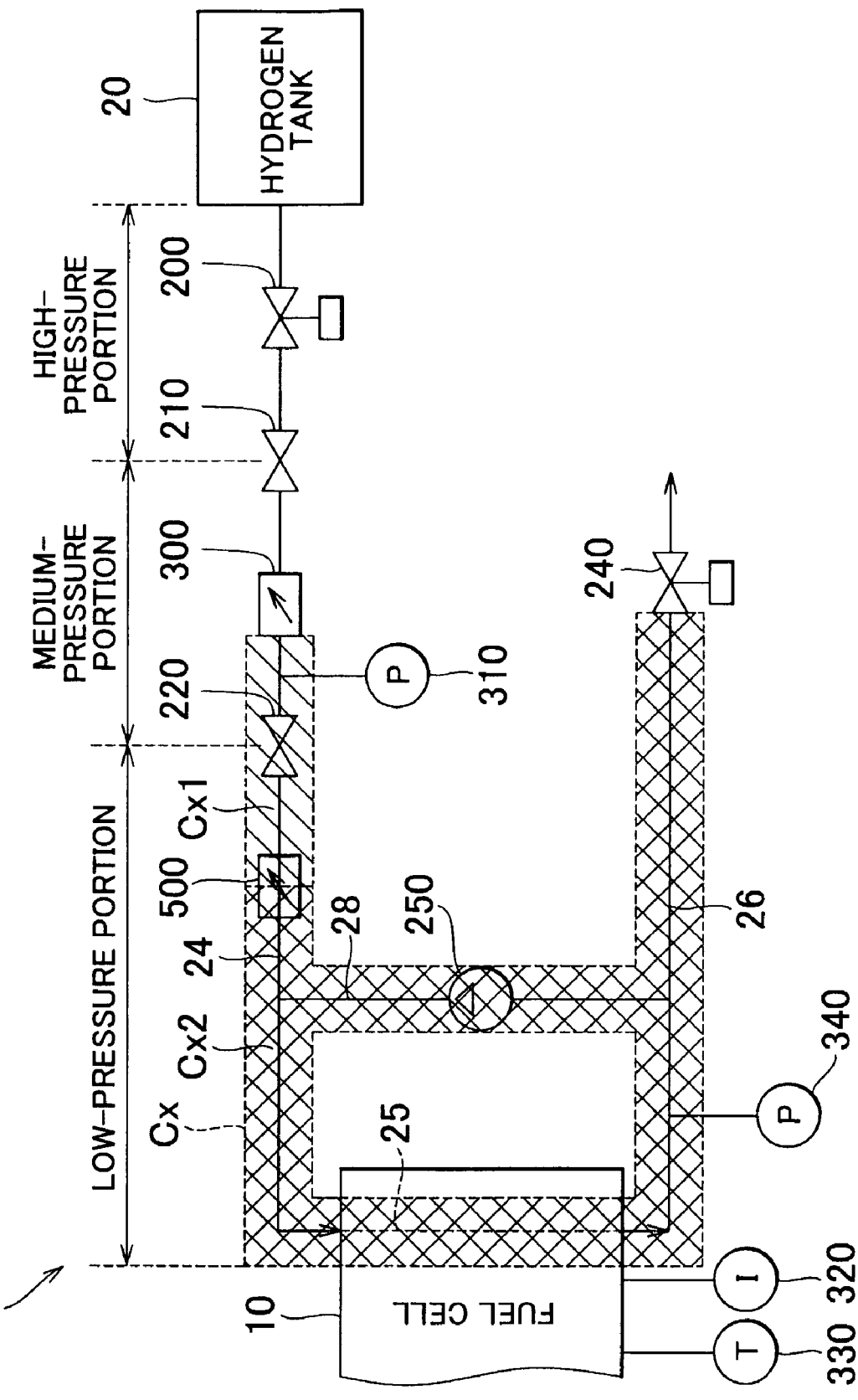
FIG. 7 is an explanatory diagram showing the enlarged portion of anode system passages in the second embodiment.

FIG. 7 is an explanatory diagram showing the enlarged anode system passages in the second embodiment. As shown in FIG. 7, in the second embodiment, the hydrogen gas leak detection process is executed in the same passage as the leak detection passage Cx in the first embodiment. In the second embodiment, however, a portion of the fuel gas supply passage 24 between the HFM 300 and the HFM 500 is referred to as "inter-HFM passage Cx1" in the leak detection passage Cx. A portion of the fuel gas supply passage 24 other than the inter-HFM passage Cx1, that is, a portion of the fuel gas supply passage 24 downstream of the HFM 500 in the gas supply direction is referred to as "low-pressure portion HFM downstream passage Cx2".

First, the preparation process for the hydrogen leak detection process will be described. As shown in FIG. 6A, before executing the hydrogen leak detection process, the leak detection execution portion 410 receives the unit time fuel gas amount from each of the HFM 500 and the HFM 300 at given time intervals (step S250). In the second embodiment, the unit time fuel gas amount received from the HFM 500 is referred to as "unit time fuel gas amount Qy1". The unit time fuel gas amount received from the HFM 300 is referred to as "unit time fuel gas amount Qy2".

Next, the leak detection execution portion 410 determines whether both of the unit time fuel gas amount Qy1 and the unit time fuel gas amount Qy2 are constant, and the condition is steady in the leak detection passage Cx (step S270). More specifically, the leak detection execution portion 410 calculates the absolute value of the difference between the unit time fuel gas amounts Qy1 and Qy2 (hereinafter, referred to as "absolute value of difference"). The leak detection execution portion 410 determines whether the present absolute value of difference is substantially equal to the absolute value of difference that is calculated when the unit time fuel gas amounts Qy1 and Qy2 are detected last time (hereinafter, referred to as "previous absolute value of difference").

When the present absolute value of difference is substantially equal to the previous absolute value of difference, the leak detection execution portion 410 determines that the condition is steady in the leak detection passage Cx (YES in step S270), and finishes this preparation process. Then, the leak detection execution portion 410 executes the hydrogen leak detection process.

When the present absolute value of difference is not substantially equal to the previous absolute value of difference, the leak detection execution portion 410 determines that the condition is unsteady in the leak detection passage Cx (NO in step S270), and repeatedly executes steps S250 and S270.

Subsequently, the hydrogen leak detection process in the second embodiment will be described. While the hydrogen leak detection process is being executed, the process of purging the fuel gas discharged from the anode by opening the purge valve 240 is not executed. As shown in FIG. 6B, in the hydrogen leak detection process, first, the leak detection execution portion 410 determines whether the unit time fuel gas amounts Qy1 and Qy2 that are detected at the end of the preparation process (FIG. 6A) are equal (step S320). The leak detection execution portion 410 may determine whether the difference between the unit time fuel gas amounts Qy1 and Qy2 is in a predetermined range, instead of determining whether the unit time fuel gas amounts Qy1 and Qy2 are equal. The predetermined range is decided based on the margin of error in the detection of each of the unit time fuel gas amounts Qy1 and Qy2. That is, in the case where the unit time fuel gas amounts Qy1 and Qy2 cannot be regarded as equal even when the margin of error is taken into account, the leak detection execution portion 410 determines that the difference between the unit time fuel gas amounts Qy1 and Qy2 is not in the predetermined range.

When the unit time fuel gas amounts Qy1 and Qy2 are not equal (NO in step S320), the leak detection execution portion 410 determines that a hydrogen leak is present in the inter-HFM passage Cx1 (step S330). Then, the leak detection execution portion 410 stops the operation of the fuel cell 10 (step S410), and finishes this hydrogen leak detection process.

When the unit time fuel gas amounts Qy1 and Qy2 are equal (YES in step S320), the leak detection execution portion 410 determines that no hydrogen leak is present in the inter-HFM passage Cx1 (step S340).

The leak detection execution portion 410 calculates the amount of fuel gas flowing into the leak detection passage Cx (hereinafter, referred to as "detected fuel gas amount Q'") based on the value measured by the HFM 300 during a predetermined leak detection period Y (step S350). In the second embodiment, a leak detection period Y is $\beta$ seconds.

The leak detection execution portion 410 calculates the amount of fus1 gas (hydrogen gas) consumed by the fuel cell 10 to generate electric power (hereinafter, referred to as "consumption amount Q1'") (step S360). More specifically, the leak detection execution portion 410 receives, from the electric current sensor 320, an average electric current value Iav' (A) that is the average value of electric current generated by the fuel cell 10 during the leak detection period X. Then, the leak detection execution portion 410 calculates the consumption amount Q1' according to the equation (1) described above, using the average electric current value Iav' instead of the average electric current value Iav, and using $\beta$ instead of $\alpha$. The consumption amount Q1' is expressed in terms of the standard state.

Further, the leak detection execution portion 410 calculates the amount of fuel gas permeating the electrolyte membrane (hereinafter, referred to as "permeation amount Q2'") (step S370). More specifically, the leak detection execution portion 410 receives, from the temperature sensor 330, an average cell temperature Tav' (K) of the fuel cell 10 during the leak detection period Y. Then, the leak detection execution portion 410 obtains a unit time permeation amount Q2a' based on the average cell temperature Tav', using the aforementioned Arrhenius plot (FIG. 4). Then, the leak detection execution portion 410 calculates the permeation amount Q2' in the standard state, according to the aforementioned equation (2) using the unit time permeation amount Q2a' instead of the unit time permeation amount Q2a, and $\beta$ instead of $\alpha$.

The leak detection execution portion 410 calculates the estimated leak amount ΔQx' (Nl) (step S380). More specifically, the leak detection execution portion 410 calculates the estimated leak amount ΔQx' by subtracting the consumption amount Q1' and the permeation amount Q2' from the detected fuel gas amount Q'.

$$\Delta Q' = Q' - Q1' - Q2'(Nl) \tag{10}$$

Subsequently, the leak detection execution portion 410 determines whether a hydrogen leak is present in the low-pressure portion HFM downstream passage Cx2 of the leak detection passage Cx (step S390). The leak detection execution portion 410 compares the estimated leak amount ΔQx' with a predetermined threshold value F'. When the estimated leak amount ΔQx' is equal to or greater than the threshold value F' (YES in step S390), the leak detection execution portion 410 determines that a hydrogen leak is present in the low-pressure portion HFM downstream passage Cx2 (that is, the leak detection execution portion 410 detects a hydrogen leak) (step S400), stops the operation of the fuel cell 10 (step S410), and terminates this hydrogen leak detection process. In this case, the estimated leak amount ΔQx' shows the hydrogen leak amount in the low-pressure portion HFM downstream passage Cx2.

When the estimated leak amount ΔQx' is less than the threshold value F' (NO in step S390), the leak detection execution portion 410 determines that no hydrogen leak is present in the low-pressure portion HFM downstream passage Cx2 (step S420). Then, the leak detection execution portion 410 finishes the hydrogen leak detection process in this embodiment.

In the hydrogen leak detection process in the first embodiment, after the condition becomes steady in the leak detection passage Cx, the leak detection execution portion 410 determines whether a hydrogen leak is present in the leak detection passage Cx. Thus, the purge amount that is the amount of gas discharged from the purge valve 240, the change in the amount of fuel gas in the leak detection passage Cx due to a change in the pressure in the leak detection passage Cx, and the like do not need to be taken into account. Therefore, a hydrogen leak can be accurately detected.

Also, in the hydrogen leak detection process in the second embodiment, it can be easily determined whether a hydrogen leak is present in the inter-HFM passage Cx1 of the leak detection passage Cx by comparing the unit time fuel gas amounts Qy1 and Qy2.

Further, in the hydrogen leak detection process in the second embodiment, when the leak detection execution portion 410 determines that a hydrogen leak is present in the inter-HFM passage Cx1 or in the low-pressure portion HFM downstream passage Cx2 (step S330 or step S400), the operation of the fuel cell 10 is stopped (step S410). Thus, the waste of hydrogen gas due to a hydrogen leak can be prevented.

The leak detection execution portion 410 in the second embodiment can be regarded as the amount detector and the hydrogen gas leak detection according to the invention.

C. Third Embodiment

Next, a third embodiment will be described. Basically, the fuel cell system 120 in the third embodiment has the configuration similar to that of the fuel cell system 100 in the first embodiment. That is, the fuel cell system 120 in the third embodiment has the same configuration as that of the fuel cell system 110 in the second embodiment (FIG. 5). Each of the HFM 300 and the HFM 500 in the third embodiment has the function of detecting the direction of the flow of fuel gas in each HFM. That is, when the unit time fuel gas amount indicated by each HFM is a positive value, fuel gas flows in each HFM toward the fuel cell 10. When the unit time fuel gas amount indicated by each HFM is a negative value, fuel gas flows in each HFM toward the hydrogen tank 20.

Figure 8:
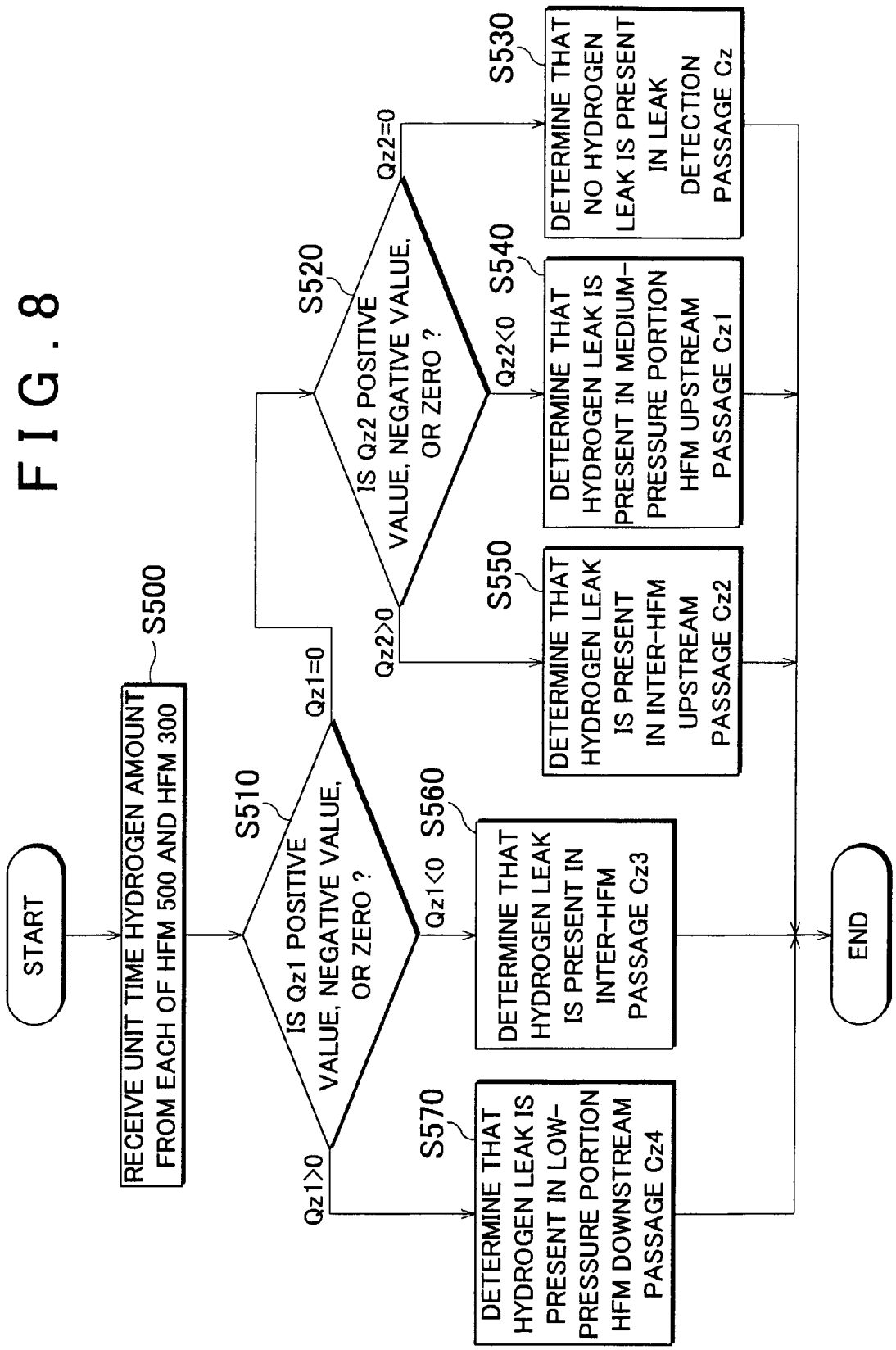
FIG. 8 is a flowchart showing a hydrogen leak detection process according to a third embodiment of the invention.

FIG. 8 is a flowchart showing a hydrogen leak detection process in a third embodiment of the invention. The fuel cell system 120 in the third embodiment executes the hydrogen leak detection process shown in FIG. 8, in addition to the hydrogen leak detection process in each of the first and second embodiments. In the first embodiment, the leak detection execution portion 410 executes the hydrogen leak detection process when the fuel cell 10 is operating. In the third embodiment, the leak detection execution portion 410 executes the hydrogen leak detection process shown in FIG. 8 when the fuel cell 10 is not operating. Hereinafter, the hydrogen leak detection process in the third embodiment will be described.

Figure 9:
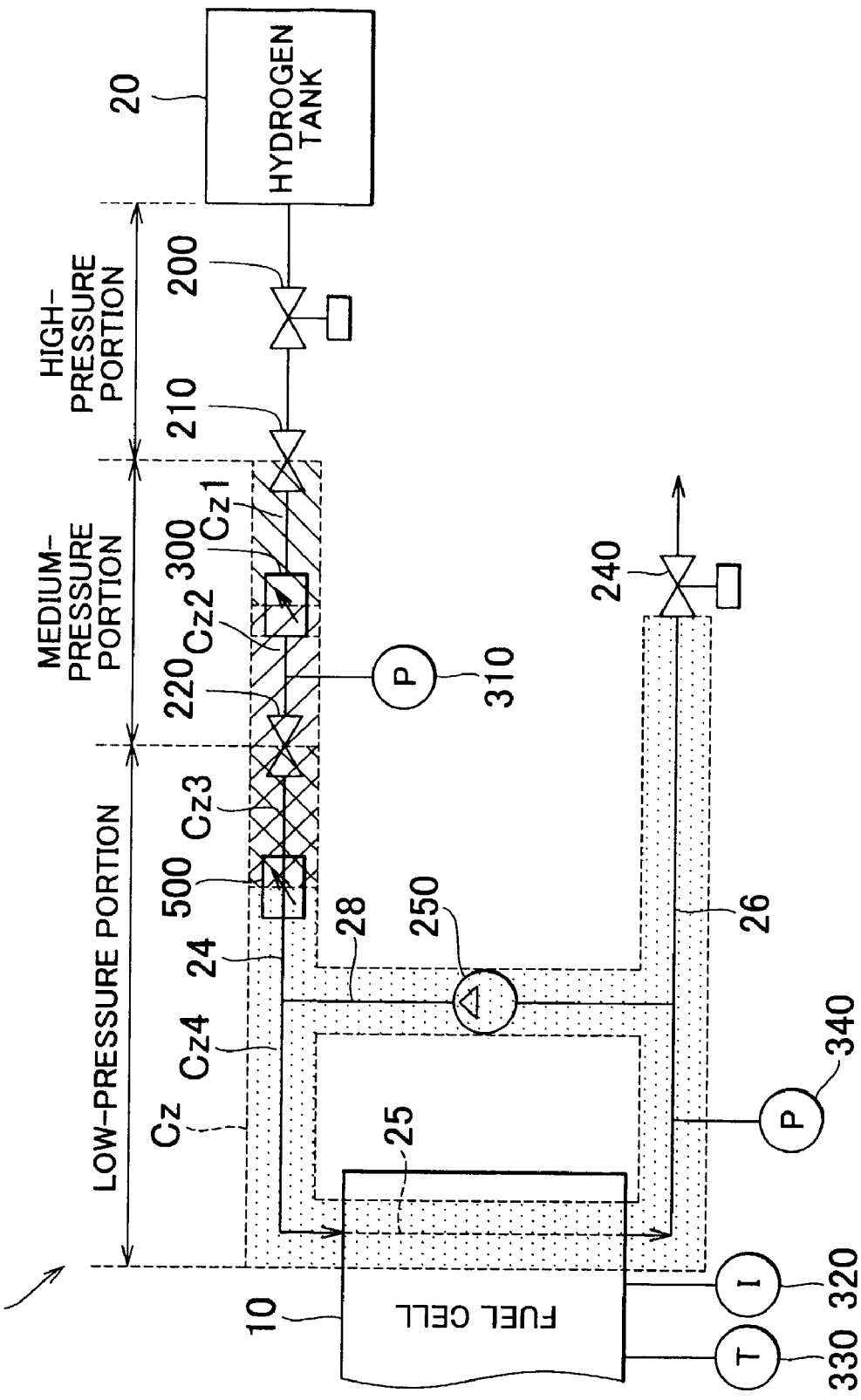
FIG. 9 is an explanatory diagram showing the enlarged portion of anode system passages in the third embodiment.

FIG. 9 is an explanatory diagram showing the enlarged anode system passages in the third embodiment. In the third embodiment, a leak detection passage Cz where the hydrogen gas leak detection is executed includes the leak detection passage Cx in the first embodiment and a passage of the fuel gas supply passage 24 between the HFM 300 and the first regulator 210 (hereinafter, referred to as "medium-pressure portion HFM upstream passage Cz1"; the region indicated by rising diagonal lines from bottom left to top right in FIG. 9). In the leak detection passage Cz, a portion of the fuel gas supply passage 24 between the second regulator 220 and the HFM 300 is referred to as "inter-HFM upstream passage Cz2" (i.e., the region indicated by falling diagonal lines from top left to bottom right in FIG. 9). A portion of the fuel gas supply passage 24 between the HFM 500 and the second regulator 220 is referred to as "inter-HFM downstream passage Cz3" (i.e., the region indicated by crossed lines in FIG. 9). A portion of the fuel gas supply passage 24 downstream of the HFM 500 in the gas supply direction (i.e., the region indicated by spots in FIG. 9).

The leak detection execution portion 410 executes the hydrogen leak detection process in the third embodiment at predetermined time intervals. First, the leak detection execution portion 410 receives the unit time fuel gas amount from each of the HFM 500 and HFM 300 when the fuel cell 10 is not operating, that is, when the cut-off valve 200 is closed (step S500). In this case, the unit time fuel gas amount detected by the HFM 500 is referred to as "unit time fuel gas amount Qz1". The unit time fuel gas amount detected by the HFM 300 is referred to as "unit time fuel gas amount Qz2".

Subsequently, the leak detection execution portion 410 determines whether the unit time fuel gas amount Qz1 is a positive value, a negative value, or zero (step S510).

In the case where the unit time fuel gas amount Qz1 is zero (step S510: Qz1=0), that is, when the HFM 500 detects no flow of fuel gas, the leak detection execution portion 410 determines whether the unit time fuel gas amount Qz2 is a positive value, a negative value, or zero (step S520).

In the case where the unit time fuel gas amount Qz2 is also zero (step S520: Qz2=0), that is, the HFM 300 detects no flow of fuel gas, the leak detection execution portion 410 determines that no hydrogen leak is present in the leak detection passage Cz (step S530), because no fuel gas flows in the HFM 300 and the HFM 500.

In the case where the unit time fuel gas amount Qz2 is a negative value (step S520: Qz2<0), the leak detection execution portion 410 determines that fuel gas flows from the inter-HFM upstream passage Cz2 to the medium-pressure portion HFM upstream passage Cz1, and determines that a hydrogen leak is present in the medium-pressure portion HFM upstream passage Cz1 (step S540). In this case, the amount of hydrogen leaking per unit time is equal to the absolute value of the unit time fuel gas amount Qz2. In this case, the leak detection execution portion 410 does not determine that a hydrogen leak is present in a portion of the fuel gas supply passage 24 upstream of the first regulator 210 in the gas supply direction (hereinafter, referred to as "medium/ high-pressure portion regulator upstream passage") for the following reason. Even if a hydrogen leak is present in the medium/high-pressure portion regulator upstream passage, fuel gas in the medium-pressure portion HFM upstream passage Cz1 does not flow into the medium/high-pressure portion regulator upstream passage through the first regulator 210 due to the characteristic of the first regulator 210, and therefore the HFM 300 cannot detect a change in the flow of fuel gas.

In the case where the unit time fuel gas amount Qz2 is a positive value (step S520: Qz2>0), the leak detection execution portion 410 determines that fuel gas flows from the medium-pressure portion HFM upstream passage Cz1 to the inter-HFM upstream passage Cz2, and determines that a hydrogen leak is present in the inter-HFM upstream passage Cz2 (step S550). In this case, the amount of fuel gas leaking per unit time is the unit time fuel gas amount Qz2. In this case, the leak detection execution portion 410 does not determine that a hydrogen leak is present in the inter-HFM downstream passage Cz3 or the low-pressure portion HFM downstream passage Cz4 for the following reason. When a hydrogen leak is present in the inter-HFM upstream passage Cz2, fuel gas in the inter-HFM downstream passage Cz3 does not flow into the inter-HFM upstream passage Cz2 through the second regulator 220 due to the characteristic of the second regulator 220.

In the case where the unit time fuel gas amount Qz1 is a negative value (step S510: Qz1<0), the leak detection execution portion 410 determines that fuel gas flows from the low-pressure portion HFM downstream passage Cz4 to the inter-HFM downstream passage Cz3, and determines that a hydrogen leak is present in the inter-HFM downstream passage Cz3 (step S560). In this case, the amount of hydrogen leaking per unit time is equal to the amount obtained by adding the unit time fuel gas amount Qz2 to the absolute value of the unit time fuel gas amount Qz1.

Further, in the case where the unit time fuel gas amount Qz1 is a positive value (step S510: Qz1>0), the leak detection execution portion 410 determines that fuel gas flows from the inter-HFM downstream passage Cz3 to the low-pressure portion HFM downstream passage Cz4, and determines that a hydrogen leak is present in the low-pressure portion HFM downstream passage Cz4 (step S570). The amount of fuel gas leaking per unit time is equal to the unit time fuel gas amount Qz1.

After steps S530 to 570 are finished, the hydrogen leak detection process is finished.

In the hydrogen leak detection process in this embodiment, a hydrogen leak in the leak detection passage Cz can be detected based on the unit time fuel gas amount Qz1 detected by the HFM 500 and the unit time fuel gas amount Qz2 detected by the HFM 300. When a hydrogen leak is present in the leak detection passage Cz, the position where the hydrogen leak is present can be determined from among the medium-pressure portion HFM upstream passage Cz1, the inter-HFM upstream passage Cz2, the inter-HFM downstream passage Cz3, and the low-pressure portion HFM downstream passage Cz4. Therefore, the position where the hydrogen leak is present can be determined quickly. Also, in the third embodiment, the leak detection passage Cz in the hydrogen leak detection process includes the medium-pressure portion HFM upstream passage Cz1 in addition to the leak detection passage Cx in the first embodiment. Therefore, a hydrogen leak can be detected in a greater leak detection passage than the leak detection passage in the first embodiment. Also, a hydrogen leak can be detected when the fuel cell 10 is operating and when the fuel cell 10 is not operating.

The leak detection execution portion 410 in the second embodiment can be regarded as the hydrogen gas leak detector according to the invention.

D. Modified Example

The invention is not limited to the aforementioned embodiments. The invention can be realized in various embodiments without departing from the true spirit of the invention.

D1. First Modified Example

In a first modified example, an operation test is conducted on any one of the hydrogen flow meters in the aforementioned embodiments (the HFM 300 or the HFM 500) using one of two methods described below. Hereinafter, the hydrogen flow meter on which the operation test is conducted will be referred to as "test HFM". The leak detection execution portion 410 conducts the operation test on the test HFM.

A first method of conducting the operation test on the test HFM will be described. In this method, in the fuel cell system in each of the aforementioned embodiments, a temperature sensor (not shown: hereinafter, referred to as "test temperature sensor") is provided in the fuel gas supply passage 24. The test temperature sensor measures the temperature of fuel gas flowing in the test HFM (hereinafter, referred to as "test fuel gas temperature Th"). Also, a pressure detector (not shown: hereinafter, referred to as "test pressure detector") is provided in the fuel gas supply passage 24. The test pressure detector measures the pressure in the fuel gas supply passage 24 at a position upstream of the test HFM (hereinafter, referred to as "upstream pressure Ph2") and the pressure in the fuel gas supply passage 24 at a position downstream of the test HFM (hereinafter, referred to as "downstream pressure Ph1") in the gas supply direction. The leak detection execution portion 410 receives the test fuel gas temperature Th from the test temperature sensor, and receives the downstream pressure Ph1 and the upstream pressure Ph2 from the test pressure detector. On the basis of the test fuel gas temperature Th, and the downstream pressure Ph1 and the upstream pressure Ph2, the leak detection execution portion 410 calculates an estimated unit time fuel gas amount Qh (Nl/min) that is the estimated amount of fuel gas flowing in the test HFM per unit time, according to an equation (11) described below. In the equation (11), Sh represents the effective cross sectional area of a portion of the test HFM through which fuel gas flows. Also, the estimated unit time fuel gas amount Qh is expressed in terms of the standard state.

$$Qh = 226.3 \times Sh \times \sqrt{Ph1(Ph2 - Ph1)} \sqrt{\frac{273}{Th}} \text{ (Nl/min)} \quad (11)$$

Next, the leak detection execution portion 410 receives the unit time fuel gas amount (Nl/min) from the test HFM. Then, the leak detection execution portion 410 obtains the absolute value of the difference between the unit time fuel gas amount and the estimated unit time fuel gas amount Qh (hereinafter, referred to as "test absolute value U1"). Further, the leak detection execution portion 410 compares the test absolute value U1 with a predetermined threshold value Jh. When the test absolute value U1 is less than the threshold value Jh, the leak detection execution portion 410 determines that the test HFM operates normally. When the test absolute value U1 is equal to or greater than the threshold value Jh, the leak detection execution portion 410 determines that the test HFM operates abnormally.

Thus, an abnormality in the test HFM can be detected. This prevents the test HFM from wrongly measuring the fuel gas amount, which improves the hydrogen leak detection accuracy.

The leak detection execution portion 410 in this modified example can be regarded as the first pressure difference sensor and the first amount estimation portion.

Next, a second method of conducting the operation test on the test HFM will be described. In this method, in the fuel cell system in each of the aforementioned embodiments, a regulator (not shown: hereinafter, referred to as "test regulator") is provided in the fuel gas supply passage 24 at a position upstream or downstream of the test HFM in the gas supply direction. Also, a pressure detector (not shown: hereinafter, referred to as "test pressure detector") is provided in the fuel gas supply passage 24. The test pressure detector measures the pressure in the fuel gas supply passage 24 at a position upstream of the test regulator (hereinafter, referred to as "upstream pressure Pm2") and the pressure in the fuel gas supply passage 24 at a position downstream of the test regulator (hereinafter, referred to as "downstream pressure Pm1"). Further, a temperature sensor (hereinafter, referred to as "test temperature sensor) is provided. The test temperature sensor measures the temperature of fuel gas flowing in the test regulator (hereinafter, referred to as "test fuel gas temperature Tm"). The leak detection execution portion 410 receives the test fuel gas temperature Tm from the test temperature sensor, and the downstream pressure Pm1 and the upstream pressure Pm2 from the test pressure detector. On the basis of the test fuel gas temperature Tm, and the downstream pressure Pm1 and the upstream pressure Pm2, the leak detection execution portion 410 calculates an estimated unit time fuel gas amount Qm (Nl/min) that is the estimated amount of fuel gas flowing in the test HFM per unit time, according to an equation (12) described below. In the equation (12), Sm represents the effective cross sectional area of a portion of the test regulator through which fuel gas flows. The estimated unit time fuel gas amount Qm is expressed in terms of the standard state.

$$Qm = 226.3 \times Sm \times \sqrt{Pm1(Pm2 - Pm1)} \sqrt{\frac{273}{Tm}} \text{ (Nl/min)} \quad (12)$$

Next, the leak detection execution portion 410 receives the unit time fuel gas amount (Nl/min) from the test HFM. Then, the leak detection execution portion 410 obtains the absolute value of the difference between the unit time fuel gas amount and the estimated unit time fuel gas amount Qm (hereinafter, referred to as "test absolute value U2"). Further, the leak detection execution portion 410 compares the test absolute value U2 with a predetermined threshold value Jm. When the test absolute value U2 is less than the threshold value Jm, the leak detection execution portion 410 determines that the test HFM operates normally. When the test absolute value U2 is equal to or greater than the threshold value Jm, the leak detection execution portion 410 determines that the test HFM operates abnormally.

Thus, an abnormality in the test HFM can be detected. This prevents the test HFM from wrongly measuring the fuel gas amount, which improves the hydrogen leak detection accuracy.

The leak detection execution portion 410 in this modified example can be regarded as the second pressure difference sensor and the second amount estimation portion according to the invention.

D2. Second Modified Example

In the first embodiment or the second embodiment, the hydrogen flow meter (the HFM 300 or the HFM 500) measures the amount of fuel gas supplied from the hydrogen tank 20. However, the invention is not limited to this configuration. In the second modified example, the amount of hydrogen gas (fuel gas) supplied from the hydrogen tank 20 is estimated using the same method as that used to calculate the estimated amount of fuel gas flowing in the test HFM per unit time (i.e., the estimated unit time fuel gas amount Qh or the estimated unit time fuel gas amount Qm (N/min)). The estimated fuel gas amount is used in the hydrogen leak detection process in the first embodiment or the second embodiment. With this configuration, a hydrogen leak can be detected without using the hydrogen flow meter.

D3. Third Modified Example

In the third modified example, the hydrogen leak detection process is stopped, in the case where the output of the fuel cell 10 increases when the hydrogen leak detection process in the first embodiment or the second embodiment is executed. This prevents the reduction of the hydrogen leak detection accuracy due to an increase in the output of the fuel cell 10, which prevents an error in detecting a hydrogen leak.

D4. Fourth Modified Example

In the first embodiment or the second embodiment, the fuel cell 10 is provided with only one electric current sensor that detects the electric current generated by the fuel cell 10. However, the invention is not limited to this configuration. In the fourth modified example, the fuel cell 10 is provided with a plurality of electric current sensors having different detection ranges. In this case, the leak detection execution portion 410 receives the electric current value from the electric current sensor having the detection range corresponding to the output of the fuel cell 10 among the plurality of electric current sensors when executing the hydrogen leak detection process in the first embodiment or the second embodiment. With this configuration, the consumption amount can be calculated accurately, which improves the hydrogen leak detection accuracy.

D5. Fifth Modified Example

In the first embodiment, the hydrogen leak detection process is executed at predetermined time intervals. However, the invention is not limited to this configuration. In a fifth modified example, the hydrogen leak detection process is executed when the electric current value detected by the electric current sensor 320 is almost zero, for example, when the fuel cell 10 is operating intermittently, when the operation of the fuel cell 10 starts, or when the fuel cell 10 is not operating. Also, when the purge valve 240 is opened to execute the purge operation, the hydrogen leak detection process is not executed. With this configuration, the consumption amount, the purge amount, or the change amount does not need to be taken into account in the calculation of the estimated hydrogen leak amount, which improves the hydrogen leak detection accuracy.

D6. Sixth Modified Example

In the first embodiment or the second embodiment, unnecessary gas such as nitrogen and water vapor may flow into the fuel gas passage 25 from the cathode through the electrolyte membrane. In this case, the amount of unnecessary gas that permeates the electrolyte membrane (hereinafter, referred to as "unnecessary permeation gas") is obtained using, for example, the Arrhenius plot that is obtained in advance through experiment. The partial pressure of the unnecessary permeation gas in the leak detection passage Cx is obtained. The partial pressure of hydrogen gas is obtained by subtracting the partial pressure of the unnecessary permeation gas from the total pressure. The proportion of hydrogen gas is obtained by dividing the partial pressure of hydrogen by the total pressure. The permeation amount Q2, the purge amount Q3, and the change amount Q4 are multiplied by the proportion of hydrogen. On the basis of the permeation amount Q2, the purge amount Q3, and the change amount Q4 multiplied by the proportion of hydrogen gas, the estimated leak amount $\Delta Qx$ is calculated. With this configuration, a hydrogen leak can be detected taking into account the unnecessary permeation gas, which improves the hydrogen leak detection accuracy.

D7. Seventh Modified Example

The seventh modified example is the same as the first embodiment, except that the leak detection execution portion 410 stops the circulation pump 250 during the leak detection period X. This configuration reduces the influence of pulsation generated by the circulation pump 250 on the HFM 300. As a result, the leak detection execution portion 410 can receive the more accurate unit time fuel gas amount from the HFM 300, which improves the hydrogen leak detection accuracy. Also, this configuration suppresses a change in the pressure in the leak detection passage Cx. As a result, the leak detection execution portion 410 can accurately calculate the change amount Q4, which improves the hydrogen leak detection accuracy.

D8. Eighth Modified Example

In an eighth modified example, the leak detection execution portion 410 executes a filtering process on the waveform indicating a change in the unit time fuel gas amount detected by the HFM 300 or the HFM 500 (hereinafter, referred to as "detected fuel gas amount waveform"), according to the pulsation generated by the circulation pump 250. More specifically, the leak detection execution portion 410 estimates the waveform of the pulsation generated by the circulation pump 250 based on the rotational speed of the circulation pump 250. The leak detection execution portion 410 obtains a filtering waveform by changing the phase of the estimated waveform of the pulsation by it, and superimposes the filtering waveform onto the detected fuel gas amount waveform. With this configuration, the leak detection execution portion 410 can reduce the influence of the pulsation generated by the circulation pump 250 on the HFM 300, without stopping the circulation pump 250. Therefore, the leak detection execution portion 410 can receive the more accurate unit time fuel gas amount from the HFM 300, which improves the hydrogen leak detection accuracy.

The leak detection execution portion 410 in the seventh modified example and the eighth modified example can be regarded as the correction portion according to the invention.

D9. Ninth Modified Example

In the ninth modified example, a hybrid system is configured by combining the fuel cell in each of the aforementioned embodiments with a predetermined secondary battery. With this configuration, the fuel cell 10 can be appropriately operated in a steady condition according to the situation. That is, the condition can be easily made steady in the leak detection passage Cx, which improves the hydrogen leak detection accuracy. The secondary battery may be a predetermined battery or the same fuel cell as that in the aforementioned embodiments.

D10. Tenth Modified Example

In the tenth modified example, it is determined whether the difference between the estimated leak amount $\Delta Qx$ and the threshold value F is in a predetermined range (that is, the estimated leak amount $\Delta Qx$ is approximately the same as the threshold value F) in step S160 (FIG. 3) in the hydrogen leak detection process in the first embodiment. In the case where the difference between the estimated leak amount $\Delta Qx$ and the threshold value F is in the predetermined range, a determination as to whether a hydrogen leak is present is not made immediately. Steps S100 to S160 in the hydrogen leak detection process are repeatedly executed a predetermined number of times. Each time steps S100 to S160 are executed, the estimated leak amount $\Delta Qx$ is compared with the threshold value F. Then, a determination as to whether a hydrogen leak is present in the leak detection passage Cx is made based on the result of comparison. With this configuration, in the case where the difference between the estimated hydrogen leak amount $\Delta Qx$ and the threshold value F is in the predetermined range, an error in detecting a hydrogen leak can be prevented, which improves the hydrogen leak detection accuracy. Also, in this modified example, when the estimated leak amount $\Delta Qx$ becomes much greater than the threshold value F, it may be determined that a hydrogen leak is present in the leak detection passage Cx, without repeating steps S100 to S160 a plurality of times. When the estimated leak amount $\Delta Qx$ becomes much less than the threshold value F, it may be determined that no hydrogen leak is present in the leak detection passage Cx, without repeating steps S100 to S160. With this configuration, a hydrogen leak can be detected quickly. The predetermined range is decided based on the margin of error in the calculation of Q, Q1, Q2, Q3, and Q4. That is, in the case where the estimated leak amount $\Delta Qx$ and the threshold value F cannot be regarded as equal even if the margin of error is taken into account, it is determined that the difference between the estimated leak amount $\Delta Qx$ and the threshold value F is not in the predetermined range.

D11. Eleventh Modified Example

In the third embodiment, the two hydrogen flow meters (the HFM 300 and the HFM 500) are provided in the fuel gas supply passage 24. However, the invention is not limited to this configuration. In the eleventh modified example, three or more hydrogen flow meters are provided in the fuel gas supply passage 24. By receiving the unit time fuel gas amounts from the hydrogen flow meters and examining the unit time fuel gas amounts in the same manner as in the hydrogen leak detection process in the third embodiment, the leak detection execution portion 410 detects a hydrogen leak in the leak detection passage Cz. Further, by examining the unit time fuel gas amounts, the position where a hydrogen leak is present can be determined.

D12. Twelve Modified Example

In the second embodiment, the two hydrogen flow meters (the HFM 300 and the HFM 500) are provided, and the leak detection execution portion 410 determines whether the condition is steady in the leak detection passage based on the hydrogen gas amounts (fuel gas amounts) measured by the hydrogen flow meters. However, the invention is not limited to this configuration. In the twelve modified example, three or more hydrogen flow meters are provided. By receiving the fuel gas amounts from the three or more hydrogen flow meters, the leak detection execution portion 410 determines whether the condition is steady in the leak detection passage. With this configuration, it can be more accurately determined whether the condition is steady in the leak detection passage. In the case where it is determined that the condition is steady in the leak detection passage, when there is a difference between the fuel gas amounts detected by two of the hydrogen flow meters, it can be determined that a hydrogen leak is present in the position between the two hydrogen flow meters.

D13. Thirteenth Modified Example

In the hydrogen leak detection process according to the first embodiment, the purge amount Q3 (Nl) during the leak detection period X is calculated based on the integral values indicating a change in the pressure in the low-pressure portion (i.e., the integral values obtained according to the equations (3) (4)). However, the invention is not limited to this configuration. In the thirteenth modified example, the leak detection execution portion 410 calculates the purge amount Q3 (Nl) during the leak detection period X as follows. The fuel cell 10 is operated in different operating conditions in experiment in advance (i.e., the amount of electric power generated by the fuel cell, the pressure in the anode system, the temperature, and changed in experiment). The amount of fuel gas discharged per unit time by opening the purge valve 240 (hereinafter, referred to as "unit time purge amount") is detected in each operating condition. On the basis of the result, a map (hereinafter, referred to as "purge map") showing the relation between the unit time purge amount and the operating condition is made. The map is stored in predetermined memory (not shown). The leak detection execution portion 410 reads the purge map from the memory. On the basis of the purge map, the leak detection execution portion 410 obtains the unit time purge amount corresponding to the operating condition during the leak detection period X. Also, the leak detection execution portion 410 detects the time (second) during which the purge valve 240 is open during the leak detection period X, that is, the time (hereinafter, referred to as "purge time") during which fuel gas is discharged. With this configuration, the leak detection execution portion 410 calculates the purge amount Q3 during the leak detection period X based on the unit time purge amount, and the detected purge time.

D14. Fourteenth Modified Example

In the fourteenth modified example, the leak detection execution portion 410 is configured as software using a control program. Alternatively, all or part of the leak detection execution portion 410 may be configured as hardware.

The invention claimed is:

1. A gas leak detection device that detects a gas leak in a fuel cell system including a fuel cell; a fuel gas supply source; a supply passage through which fuel gas is supplied from the fuel gas supply source to the fuel cell; a discharge passage through which fuel gas is discharged from the fuel cell; and a purge valve provided in the discharge passage, which adjusts an amount of fuel gas discharged from the fuel cell, the gas leak detection device comprising:

a supply-amount detector provided in the supply passage, which detects an amount of supplied fuel gas, wherein the supply passage includes a first passage positioned downstream of the supply-amount detector, the fuel cell includes a second passage through which the fuel gas flows, the discharge passage includes a third passage positioned upstream of the purge valve, the gas leak detection device further comprising:

a consumption-amount calculator programmed to calculate an amount of fuel gas consumed by the fuel cell; a pressure detector that detects a pressure of the fuel gas in a gas leak detection passage including the first passage, the second passage, and the third passage; a change-amount calculator that obtains a change in the pressure of the fuel gas using the detected pressure, and is programmed to calculate a change in an amount of fuel gas in the gas leak detection passage due to the change in the pressure of the fuel gas; a difference-amount calculator programmed to calculate a difference between the detected amount of supplied fuel gas and a sum of the amount of consumed fuel gas and the change in the amount of fuel gas in the gas leak detection passage by subtracting the amount of consumed fuel gas and the change in the amount of fuel gas in the gas leak detection passage from the amount of supplied fuel gas; and a fuel-gas leak detector that determines that a fuel gas leak is present in the gas leak detection passage when the difference is equal to or greater than a first predetermined value.

2. The gas leak detection device according to claim 1, wherein the gas leak detection passage includes a circulation passage, one end of which is connected to the supply passage at a position downstream of the supply-amount detector, and the other end of which is connected to the discharge passage, whereby the fuel gas flows to the supply passage from the discharge passage through the circulation passage so that the fuel gas can be reused.

3. The gas leak detection device according to claim 2, wherein
the fuel cell system includes a circulation pump provided in the circulation passage, which delivers the fuel gas from the discharge passage to the supply passage,
the gas leak detection device includes a correction portion that corrects the amount of supplied fuel gas detected by the supply-amount detector so as to reduce an influence of pulsation generated by the circulation pump, and
the difference-amount programmed to calculate the difference by subtracting the amount of consumed fuel gas and the change in the amount of fuel gas in the gas leak detection passage from the corrected amount of supplied fuel gas.

4. The gas leak detection device according to claim 2, wherein
the fuel cell system includes a circulation pump provided in the circulation passage, which delivers the fuel gas from the discharge passage to the supply passage, and
the supply-amount detector detects the amount of supplied fuel gas when the circulation pump is not in operation.

5. The gas leak detection device according to claim 1, wherein
the gas leak detection passage includes a plurality of sections,
the pressure detector detects a pressure of the fuel gas in each of the plurality of sections in the gas leak detection passage,
the change-amount calculator obtains a change in the detected pressure of the fuel gas in each of the sections; the change-amount calculator obtains the change in the amount of fuel gas in each of the sections due to the change in the pressure of the fuel gas in the corresponding section; and the change-amount calculator programmed to calculate the change in the amount of fuel gas in the gas leak detection passage, by summing the changes in the amounts of fuel gas in all the sections.

6. The gas leak detection device according to claim 1, wherein
the fuel cell system includes a pressure-release valve provided in the supply passage, which reduces the pressure of the fuel gas, and
the gas leak detection device includes an amount detector that detects the amount of fuel gas, and that is provided in the supply passage such that the pressure-release valve is positioned between the amount detector and the supply-amount detector; and a leak determination permission portion that permits the fuel-gas leak detector to determine whether a fuel gas leak is present, in a case where a difference between the amount of supplied fuel gas detected by the supply-amount detector and the amount of fuel gas detected by the amount detector is in a predetermined range.

7. The gas leak detection device according to claim 6, wherein
the fuel-gas leak detector determines that a fuel gas leak is present between the supply-amount detector and the amount detector in the supply passage, when both the amount of supplied fuel gas detected by the supply-amount detector and the amount of fuel gas detected by the amount detector are constant, but the difference between the amounts is not within the predetermined range.

8. The gas leak detection device according to claim 1, wherein
the fuel cell system includes a cut-off valve provided in the supply passage at a position upstream of the supply-amount detector, which cuts off supply of the fuel gas when closed, and
the fuel-gas leak detector determines that a fuel gas leak is present in the supply passage at a position upstream of the supply-amount detector and downstream of the cut-off valve, in a case where the supply-amount detector detects a greater amount of fuel gas flowing in a direction opposite to a direction where the fuel gas is supplied than a predetermined amount when the supply of the fuel gas is cut off by closing the cut-off valve.

9. The gas leak detection device according to claim 1, wherein
the fuel cell system includes a cut-off valve provided in the supply passage at a position upstream of the supply-amount detector, which cuts off supply of the fuel gas when closed, and
the fuel-gas leak detector determines that a fuel gas leak is present in the gas leak detection passage, in a case where the supply-amount detector detects a greater amount of fuel gas flowing in a direction where the fuel gas is supplied than a predetermined amount when the cut-off valve is closed and the fuel cell is not generating electric power.

10. The gas leak detection device according to claim 1, further comprising:
a first pressure difference detector which detects an upstream pressure in the supply passage at a position upstream of the supply-amount detector and a downstream pressure in the supply passage at a position downstream of the supply-amount detector, and obtains a pressure difference between the upstream pressure and the downstream pressure by subtracting the downstream pressure from the upstream pressure; and
a first amount estimation portion which estimates an amount of fuel gas flowing in the supply-amount detector, based on the pressure difference, wherein the fuel-gas leak detector determines that an abnormality is present in the supply-amount detector, in a case where an absolute value of a difference between the amount of fuel gas estimated by the first amount estimation portion and the amount of supplied fuel gas detected by the supply-amount detector is equal to or greater than a second predetermined value.

11. The gas leak detection device according to claim 1, wherein
the fuel cell system includes a regulator which is provided in the supply passage at a position upstream or downstream of the supply-amount detector,
the gas leak detection device includes a second pressure difference detector which detects an upstream pressure in the supply passage at a position upstream of the regulator and a downstream pressure in the supply passage at a position downstream of the regulator, and obtains a pressure difference between the upstream pressure and the downstream pressure by subtracting the downstream pressure from the upstream pressure; and a second amount estimation portion which estimates an amount of fuel gas flowing in the regulator in the supply passage, based on the pressure difference obtained by the second pressure difference detector, and
the fuel-gas leak detector determines that an abnormality is present in the supply-amount detector, in a case where an absolute value of a difference between the amount of fuel gas estimated by the second amount estimation portion and the fuel gas supply amount detected by the supply-amount detector is equal to or greater than a third predetermined value.

12. A fuel cell system comprising:
a fuel cell;
a fuel gas supply source;
a supply passage through which fuel gas is supplied from the fuel gas supply source to the fuel cell;
a discharge passage through which fuel gas is discharged from the fuel cell;
a purge valve provided in the discharge passage, which adjusts an amount of fuel gas discharged from the fuel cell; and
a supply-amount detector provided in the supply passage, which detects a fuel gas supply amount that is an amount of supplied fuel gas, wherein
the supply passage includes a first passage downstream of the supply-amount detector in a supply direction in which the fuel gas is supplied from the fuel gas supply source,
the fuel cell includes a second passage through which the fuel gas flows,
the discharge passage includes a third passage upstream of the purge valve in a discharge direction in which the fuel gas is discharged from the fuel cell, and
the fuel cell system further includes a pressure detector that detects a pressure of the fuel gas in a gas leak detection passage including the first passage, the second passage, and the third passage; a consumption-amount calculator programmed to calculate an amount of fuel gas consumed by the fuel cell; a change-amount calculator that obtains a change in the pressure of the fuel gas using the detected pressure, and is programmed to calculate a change in an amount of fuel gas in the gas leak detection passage due to the change in the pressure of the fuel gas; a difference- amount calculator programmed to calculate a difference between the detected amount of supplied fuel gas and a sum of the amount of consumed fuel gas and the change in the amount of fuel gas in the gas leak detection passage by subtracting the amount of consumed fuel gas and the change in the amount of fuel gas in the gas leak detection passage from the detected amount of supplied fuel gas; and a fuel-gas leak detector that determines that a fuel gas leak is present in the gas leak detection passage when the difference is equal to or greater than a predetermined value.

13. A method for detecting a gas leak in a fuel cell system that includes a fuel cell; a fuel gas supply source; a supply passage through which fuel gas is supplied from the fuel gas supply source to the fuel cell; a discharge passage through which fuel gas is discharged from the fuel cell; and a purge valve provided in the discharge passage, which adjusts an amount of fuel gas discharged from the fuel cell; comprising detecting, at a predetermined first position within the supply passage, an amount of supplied fuel gas;

calculating an amount of fuel gas consumed by the fuel cell;

detecting a pressure of the fuel gas in a gas leak detection passage that includes a first passage downstream of the predetermined first portion in the supply passage; a second passage through which the fuel gas flows in the fuel cell; and a third passage upstream of the purge valve in the discharge passage;

obtaining a change in the pressure of the fuel gas using the detected pressure;

calculating a change in an amount of fuel gas in the gas leak detection passage due to the change in the pressure of the fuel gas;

calculating a difference between the detected amount of supplied fuel gas and a sum of the amount of consumed fuel gas and the change in the amount of fuel gas in the gas leak detection passage by subtracting the amount of consumed fuel gas and the change in the amount of fuel gas in the gas leak detection passage from the detected amount of supplied fuel gas; and determining that a fuel gas leak is present in the gas leak detection passage when the difference is equal to or greater than a predetermined value.

* * * * *